US007505671B2

(12) United States Patent
Hagiwara et al.

(10) Patent No.: US 7,505,671 B2
(45) Date of Patent: Mar. 17, 2009

(54) RECORDING/REPRODUCTION APPARATUS, SYSTEM AND PROGRAM WHICH REPRODUCES A SECTION OF A RECORDED PROGRAM BASED ON A KEYWORD RELATING TO THE SECTION AND A REPRODUCTION SPEED CORRESPONDING TO THE KEYWORD

(75) Inventors: Kazuaki Hagiwara, Fussa (JP); Takashi Onoda, Ome (JP); Kazuo Ura, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 737 days.

(21) Appl. No.: 11/066,571

(22) Filed: Feb. 23, 2005

(65) Prior Publication Data

US 2005/0185924 A1 Aug. 25, 2005

(30) Foreign Application Priority Data

Feb. 25, 2004 (JP) ............................. 2004-049112
Mar. 3, 2004 (JP) ............................. 2004-059274

(51) Int. Cl.
*H04N 5/93* (2006.01)
(52) U.S. Cl. .......................................... 386/52; 386/68
(58) Field of Classification Search ................... 386/95, 386/46, 42, 68, 52; 725/52; 715/723
See application file for complete search history.

(56) References Cited

U.S. PATENT DOCUMENTS

| 6,973,256 B1 * | 12/2005 | Dagtas ......................... 386/46 |
| 2003/0194210 A1 | 10/2003 | Shiiyama |
| 2004/0126091 A1 * | 7/2004 | Sieben et al. .................. 386/52 |
| 2004/0158861 A1 * | 8/2004 | Terakado et al. ............... 725/52 |

FOREIGN PATENT DOCUMENTS

| CN | 1404609 A | 3/2003 |
| EP | 1158795 A | 11/2001 |
| GB | 2343053 A | 4/2000 |
| JP | 2001-326925 A | 11/2001 |
| JP | 2002-16858 A | 1/2002 |
| JP | 2003-179827 | 6/2003 |
| WO | WO02/037498 A3 | 5/2002 |

* cited by examiner

*Primary Examiner*—David E Harvey
(74) *Attorney, Agent, or Firm*—Frishauf, Holtz, Goodman & Chick, P.C.

(57) ABSTRACT

Program data included in a digital television broadcast received from a broadcast station is recorded. A program keyword list that has stored keywords on program sections of the program data corresponding to broadcast time zones is received from a service company's server. Videos and voices on a program section involving a keyword that meets predetermined conditions selected from the keywords stored in the received program keyword list are reproduced.

4 Claims, 21 Drawing Sheets

| ITEM | | SET CONTENT |
|---|---|---|
| PROGRAM INFO | USER ID | 1200354 |
| | TITLE | SOCCER GAME RELAY |
| | CHANNEL | 4 |
| | DATE | 01/02/2004 |
| | PROG. START TIME | 19:00 |
| | PROG. END TIME | 21:00 |
| KEYWORD LEVEL | | 1 |
| SPECIFIED KEYWORD LIST | | GOAL, SHOOT, TEAM "A", HIGHLIGHT, ... |

| ITEM | SET CONTENT |
|---|---|
| REPRO MODE | WHOLE REPRODUCTION |
| REPRO FLAG | ON |
| REPRO GROUP NAME | HIGHLIGHT |
| REPRO KEYWORD | – |
| MATCHING CRITERION KEYWORD | – |

| GROUP NAME | COMPONENT KEYWORD |
|---|---|
| TEAM "A" | TEAM "A", PLAYERS "X", "Y", MANAGER "O" |
| HIGHLIGHT | HIGHLIGHT, GOAL, PK, SHOOT |

| | ITEM | | SET CONTENT | |
|---|---|---|---|---|
| PROG. INFO | USER ID | | 1200354 | |
| | DATE | | 01/02/2004 | |
| | TITLE | CHANNEL | SOCCER GAME RELAY | 4 |
| | PROG. START TIME | PROG. END TIME | 19:00 | 21:00 |
| LATEST WHOLE KW SCENE | INDEX NO. | | 1 | |
| | TOTAL KW SCENE TIME | | 0:50:10 | |
| | SUM OF KEYWORDS EXTRACTED | | 150 | |
| | KEYWORD LEVEL | | 1 | |
| | KEYWORD LIST | | GOAL, SHOOT, TEAM "A", HIGHLIGHT, ... | |
| | KEYWORD EMERGENCE FREQ. | | 3 FOR "GOAL", 10 FOR "SHOOT", 15 FOR "TEAM"A"", ... | |
| KEYWORD SCENE 1 | START TIME | | 19:00:00 | |
| | END TIME | | 19:00:15 | |
| | NUMBER OF KEYWORDS | | 2 | |
| | KEYWORD LIST | | PROG. START, GAME START | |
| KEYWORD SCENE 2 | START TIME | | 19:01:00 | |
| | END TIME | | 19:01:20 | |
| | NUMBER OF KEYWORDS | | 4 | |
| | KEYWORD LIST | | TEAM "A", PLAYER "X", SHOOT, GOAL FAILED | |
| ⋮ | ⋮ | | ⋮ | |

FIG.19

CONTENT DATA 1064

| KIND OF PROGRAM | SOCCER GAME RELAY |
|---|---|
| BROADCASTING ELAPSE TIME (O'CLOCK: MINUTES) | CONTENT OF SCENE |
| 0:01 | PROGRAM START |
| 0:03 | PLAYERS ENTER |
| 0:05 | SING NATIONAL ANTHEM IN UNISON |
| 0:10 | KICKOFF |
| 0:15 | NAKAMURA'S THROW-IN |
| 0:20 | TAKAHARA'S SHOOT FAILED |
| 0:32 | MIYAMOTO'S FOUL |
| 0:50 | FIRST PERIOD END |
| 0:51 | COMMERCIAL BREAK |
| 0:53 | PLAYERS ENTER |
| 0:60 | OKUBO'S SHOOTING FOR GOAL |
| 0:71 | NAKATA'S THROUGH-PASS |
| 0:85 | TAKAHARA'S DRIBBLING THROUGH |
| 0:97 | GAME END |
| 0:97 | INTERVIEW |

1064a — broadcasting elapse time column
1064b — content of scene column

FIG.20

REPRO SPEED-RELATED DATA 1044

| KIND OF PROGRAM | SOCCER GAME RELAY | | |
|---|---|---|---|
| KEYWORD | REPRO SPEED | PROG. PART | REPRO TIME |
| SHOOT | 1 (TIMES) | INCL. THE SCENE | 5 MINUTES |
| KICKOFF | 30 | TO THE SCENE | THROUGH |
| GOAL | 1 | INCL. THE SCENE | 5 MINUTES |
| FOUL | 2 | TO THE SCENE | 3 MINUTES |
| COM. BREAK | 30 | WHOLE SCENE | – |
| GAME END | 30 | AFTER THE SCENE | THROUGH |

1044a — KEYWORD
1044b — (KIND OF PROGRAM)
1044c — PROG. PART
1044d — REPRO TIME

FIG.25

Please select a repro speed, a program part and a repro time for each keyword.

| KEYWORD | REPRO SPEED | PROGRAM PART | REPRO TIME |
|---|---|---|---|
| SHOOT | 1 (TIMES) | FROM THE SCENE | 1 (MIN) |
|  | 2 | TO THE SCENE | 3 |
|  | 3 | INCL. THE SCENE | 5 |
|  | 30 | WHOLE SCENE | THRU |
| KICKOFF | 1 (TIMES) | FROM THE SCENE | 1 (MIN) |
|  | 2 | TO THE SCENE | 3 |
|  | 3 | INCL. THE SCENE | 5 |
|  | 30 | WHOLE SCENE | THRU |
| ⋮ | ⋮ | ⋮ | ⋮ |
| E1 | E2 | E3 | E4 |

RECORDING/REPRODUCTION APPARATUS, SYSTEM AND PROGRAM WHICH REPRODUCES A SECTION OF A RECORDED PROGRAM BASED ON A KEYWORD RELATING TO THE SECTION AND A REPRODUCTION SPEED CORRESPONDING TO THE KEYWORD

BACKGROUND OF THE INVENTION

1. Field of the Invention

The present invention relates to recording/reproduction apparatuses, systems and programs.

2. Description of the Related Art

At present, in digital television broadcasting, BS (Broadcasting Satellite) digital television broadcasting using broadcasting satellites and CS (Communication Satellite) digital television broadcasting using communication satellites have diffused. Digital terrestrial television broadcasting has started from December 2003 in Japan and the broadcasting is in a stage of transition from the analog terrestrial television broadcasting to the digital terrestrial television broadcasting. The terrestrial digital television broadcasting employs an OFDM (Orthogonal Frequency Division Multiplexing) system as a modulation system, thereby sending a plurality of radio waves (more specifically, of video and voice signals, and a data broadcast) in a multiplexed manner.

It is known that an electronic program guide is displayed using a data broadcast included in the digital television broadcasting. A user can view the electronic program guide while reserving video recording readily. The user can beforehand register desired keywords such that a program including the desired keywords is automatically selected from the electronic program guide, thereby recording videos (for example, see Unexamined Published Japanese Patent Application 2001-326925). Recently, recording/reproduction apparatuses of a large capacity that use a DVD (Digital Versatile Disk)-RAM according to the DVD standards and a hard disk are sold, thereby allowing the user to record videos readily without worrying about the remaining recording time.

When the viewer readily records a program based on an electronic program guide or a program involving keywords is automatically recorded, the storage unit of the recording/reproduction apparatus would end up recording many programs. Especially, a recording/reproduction apparatus that includes a built-in large-capacity memory such as a hard disk by itself is capable of recording programs for several hundred hours, so that it often occurs that the recording/reproduction apparatus ends up having recorded and stored many programs already when the viewer finds this fact.

When the viewer views a recorded program actually, a physical time is required. For example, if a 10-hour program is recorded, it would take 10 hours for the viewer to view the whole program. Thus, the viewer cannot view the whole recorded program due to restriction by time and cannot help deleting some programs for the purpose of recording new programs.

Especially, in the case of sports program relay such as a professional-baseball relay program or a soccer relay program, there are demands that the viewers wish to mainly and efficiently view highlighted scenes as high points in the program such as a scene in which a batter hit a home run or a scene in which a soccer player shot the ball without viewing the whole scene. Even in a song program there is the demand that a viewer wishes to view only scenes in which, for example, his or her favorite singer is singing.

While the use of techniques for double-speed reproduction and/or fast forwarding of videos is known, these techniques are only for reducing the time required for viewing the whole video. As a result, the viewer cannot help viewing the whole program inefficiently.

In this respect, a recording/reproduction apparatus is known that records a digital broadcast program and reproduces it at an automatically changing speed. For example, Unexamined Published Japanese Patent Application 2002-016858 discloses a digital broadcasting receiver that dynamically controls the speed of reproducing a recorded program in accordance with the reproduced voice level. In this device, the scene is reproduced at low speed when the voice level is high whereas it is reproduced at a normal speed when the voice level is low or it is reproduced at the normal speed when the voice level is high and reproduced at high speed when the voice level is low.

However, a degree of importance of each of the scenes included in the program does not necessarily coincide with its voice level. As with the digital broadcasting receiver disclosed in the publication 2002-016858, changing the reproduction speed in accordance with the voice level is effective in the reproduction of a sports relay program for a scene, for example scoring points, because the voice level increases due to a cheer from the spectators at the scene. However, the scene in which the voice level is high is not necessarily the "scoring" scene. Accordingly, this system is not necessarily effective to apply to other programs. An "important" scene in a program varies from viewer to viewer.

SUMMARY OF THE INVENTION

It is therefore an object of the present invention to provide a recording/reproduction apparatus that records a digital broadcast and efficiently reproduces a highlighted scene involved in a keyword included in the recorded program for the viewer.

According to a first aspect of the present invention, there is provided a recording/reproduction apparatus comprising: a receiver that receives a digital television broadcast; a recorder that records videos and voices on a selected program included in the received digital television broadcast; a keyword storage device that has stored a plurality of keywords each involved in a respective one of a like number of program sections of the selected program corresponding to a like number of time zones of the broadcast; and means for reading and reproducing videos and voices on a program section involved in a keyword that satisfies predetermined requirements selected from among the plurality of keywords stored in the keyword storage device.

According to a second aspect of the present invention, there is provided a recording/reproduction system comprising a recording/reproduction apparatus that receives a digital television broadcast and records and reproduces videos and voices involved in the broadcast, and a server system connectable so as to communicate with the recording/reproduction apparatus, the server system comprising: a storage device that stores a plurality of keywords each for a respective one of a like number of program sections of the digital television broadcast corresponding to a like number of time zones of the broadcast; means for selecting at least one keyword from the plurality of keywords, stored in the storage device, in accordance with a keyword selection command received from the recording/reproduction apparatus; and a transmitter that transmits to the recording/reproduction apparatus the at least one keyword selected by the selecting means and data on at least one program sections involving the selected at least one keyword, and the recording/reproduction apparatus comprising: a transmitter that transmits the keyword selection command to the server system; a receiver that receives the selected at least one keyword and data on corresponding at least one program section involving the selected at least one keyword from the server system; and means for reading and reproducing from the recorded videos and voices videos and voices on a program section involving a keyword that meets predetermined conditions selected from among the at least one keyword received by the receiver.

Another object of the present invention is to provide a recording/reproduction apparatus that records a program of a digital broadcast and reproduces the recorded program efficiently at an appropriately controlled speed.

According to a third aspect of the present invention, there is provided a recording/reproduction apparatus comprising: a receiver that receives a digital television broadcast; a program recorder that records thereon videos and voices on a selected program included in the digital television broadcast received by the receiver; a metadata recorder that records metadata of the selected program included in the received digital television broadcast and a broadcasting elapse time of the program in corresponding relationship; a speed-related data storage device that has stored reproduction speed-related data comprising a plurality of keywords, each involved in a respective one of a like number of program sections of the selected program, and a like number of reproduction speeds in corresponding relationship; a reproduction output unit that reproduces and outputs the videos and voices recorded on the program recorder; and means for controlling the reproduction output unit so as to reproduce videos and voices on a program section involving a selected keyword in the reproduction speed-related data for a part of the broadcast elapse time recorded by the metadata recorder and corresponding to the program section at a reproduction speed stored in corresponding to the selected keyword in the reproduction speed-related data.

The "metadata" is one of signals multiplexed along with the video and voice signals in the digital broadcast, and includes various information such as its attributes, identification, detailed content, etc., to complementing the program. The metadata is usually in the form of text data.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 illustrates a data structure of a program keyword list request table in the first embodiment;

FIG. 5 illustrates one example of a data structure in a set information storage area in the first embodiment;

FIG. 6 illustrates one example of a data structure in a reproduction keyword group storage area in the first embodiment;

FIG. 7 illustrates one example of a data structure of a program keyword list in the first embodiment;

FIG. 19 illustrates the structure of content data in the second embodiment;

FIG. 20 illustrates the structure of reproduction speed-related data in the second embodiment;

FIG. 25 illustrates one example of a reproduction speed-related data changing picture appearing in the second embodiment.

DETAILED DESCRIPTION OF THE EMBODIMENTS

Referring to the accompanying drawings, embodiments according to the present invention will be described. While in the following description a recording/reproduction apparatus that receives a digital terrestrial television broadcast according to the present invention will be described, the present invention is not limited to this particular example.

First Embodiment

<Structure>

Figure 1:
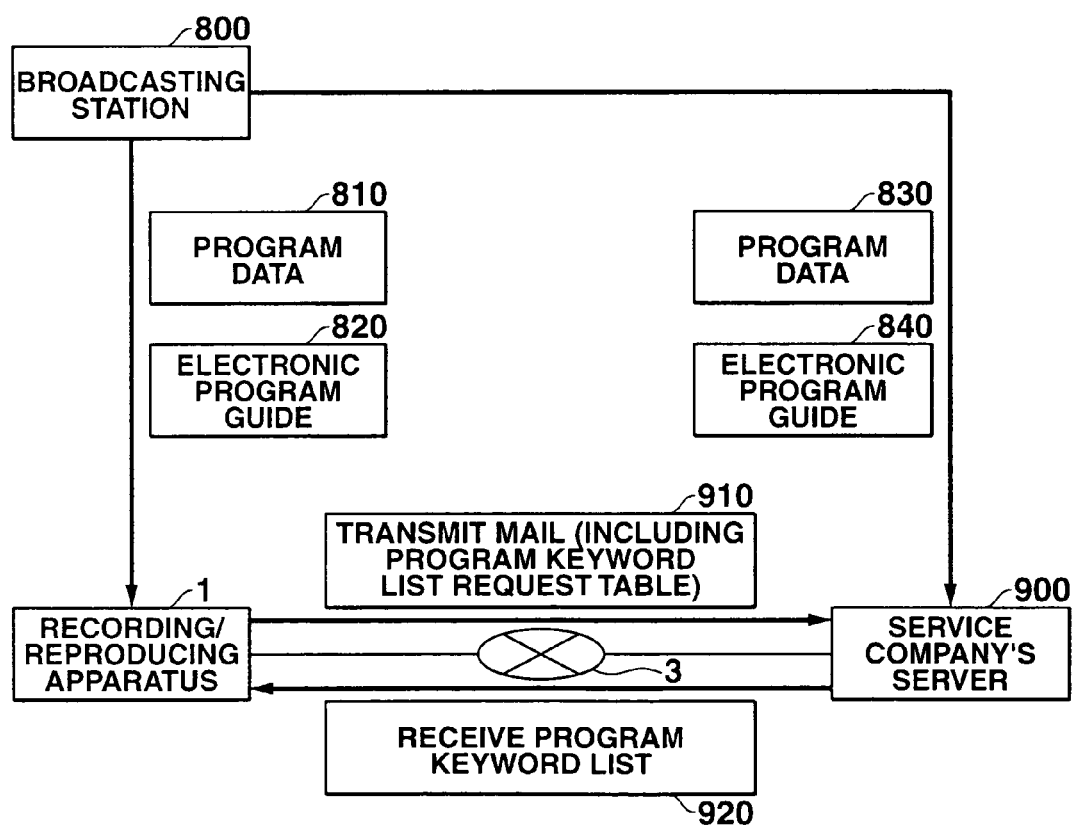
FIG. 1 schematically illustrates a whole recording/reproduction system as a first embodiment of the invention.

FIG. 1 schematically illustrates a whole system that comprises a recording/reproduction apparatus 1 in the first embodiment according to the aforementioned first aspect of the present invention, a broadcasting station 800, and a service company's server 900. The recording/reproduction apparatus 1 receives from the broadcasting station 800 a digital television broadcast that includes program data 810 and an electronic program guide 820. The service company's server 900 receives from the broadcasting station 800 a digital television broadcast including program data 830 and an electronic program guide 840. The recording/reproduction apparatus 1 and the service company's server 900 are connected with a network 3, which is assumed to include a well-known network based, for example, on the TCP/IP of the Internet, or a network which is connected by dial-up connection with an ISDN circuit line.

The recording/reproduction apparatus 1 transmits the service company's server 900 a mail 910 including a program keyword list request table 304 to be described later in more detail. The service company's server 900 creates a program keyword list 920 from the program keyword list request table 304 included in the received mail 910 and then sends it to the recording/reproduction apparatus 1. The program keyword list 920 has the same structure as a program keyword list 404 to be described later in more detail.

Figure 2:
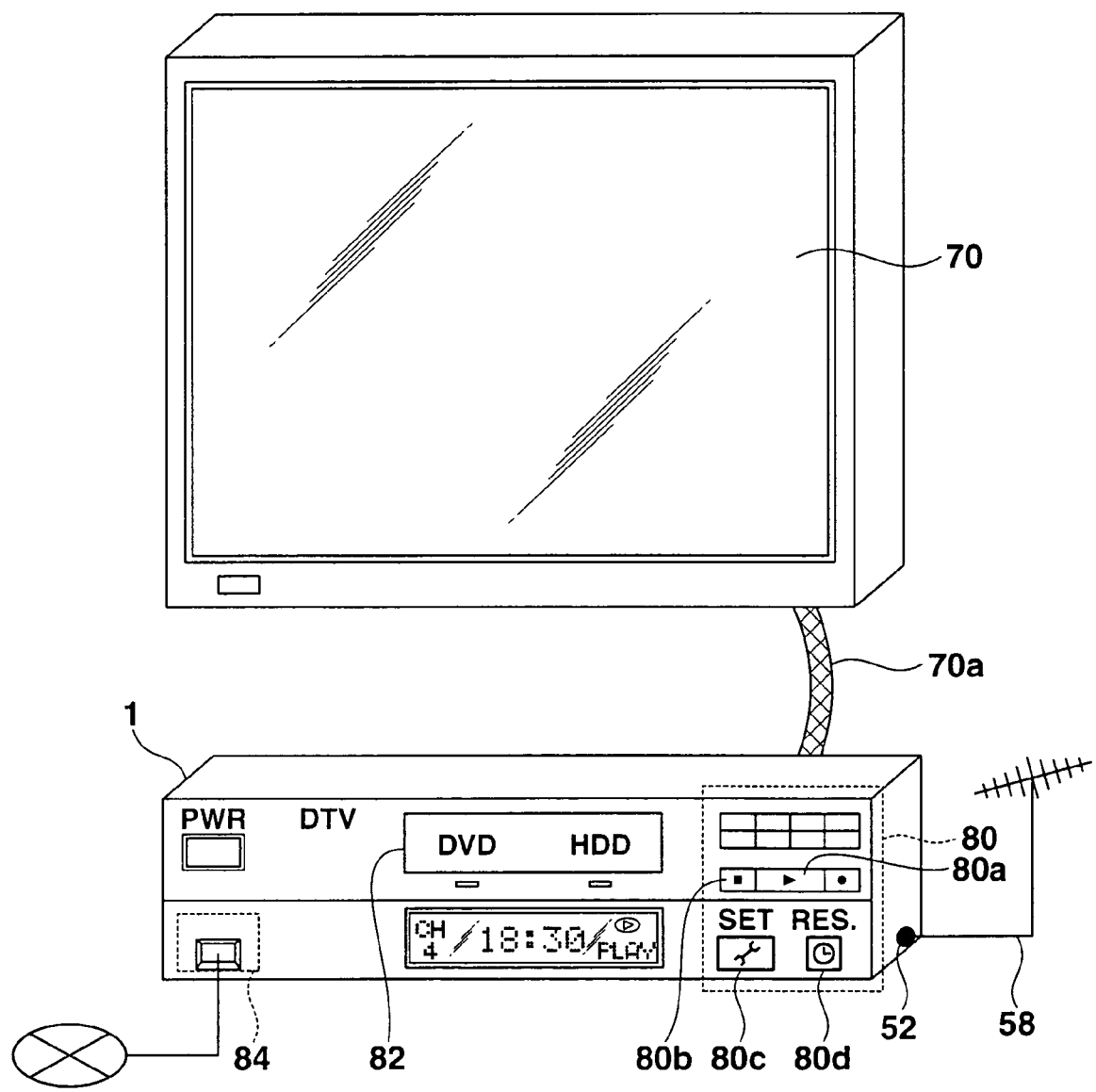
FIG. 2 schematically illustrates a recording/reproduction apparatus and a monitor in the first embodiment.
Figure 3:
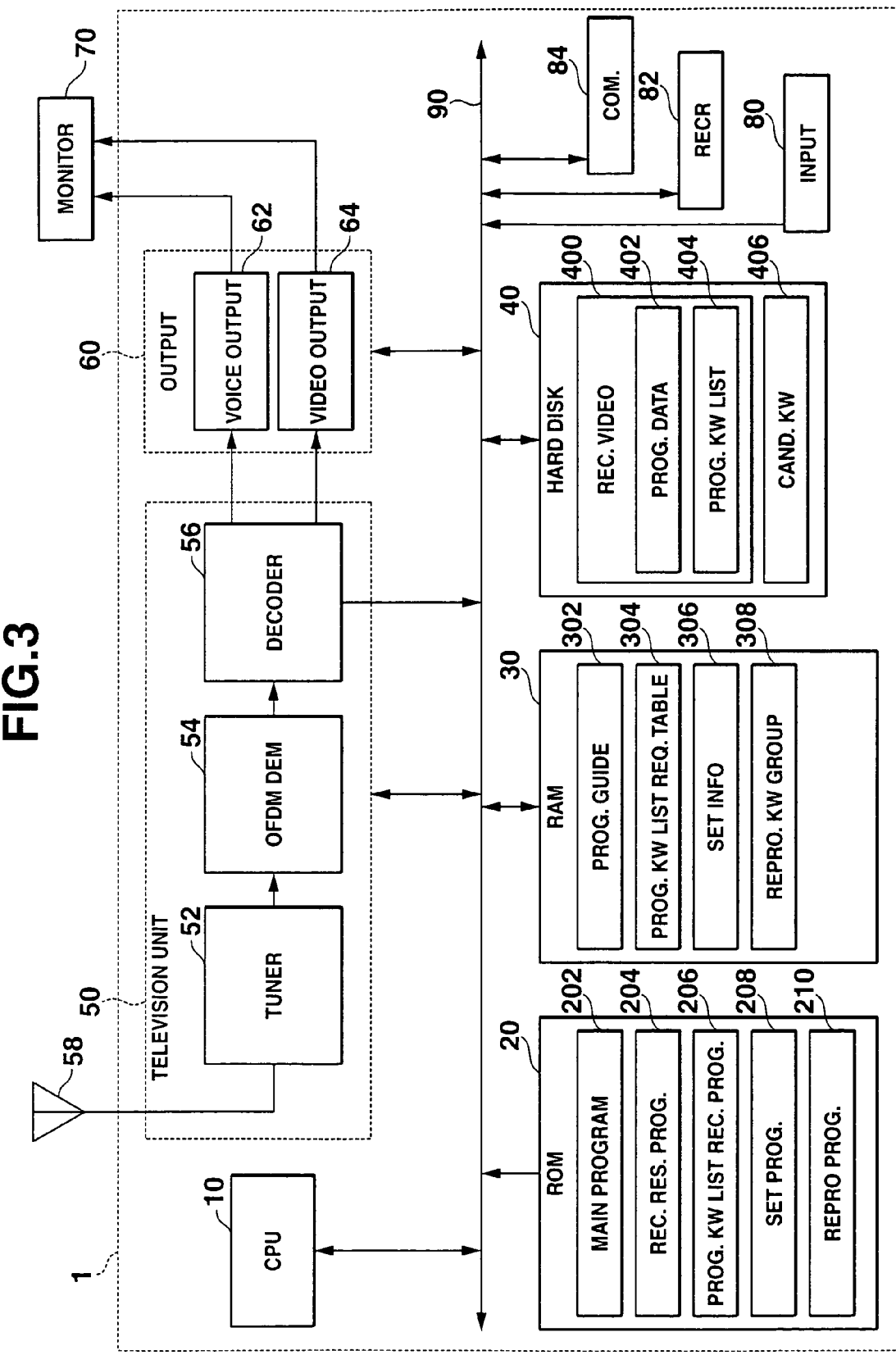
FIG. 3 illustrates a circuit composition of the recording/reproduction apparatus of the first embodiment.

Next, the recording/reproduction apparatus 1 will be described in more detail. FIG. 2 schematically illustrates the recording/reproduction apparatus 1 and a monitor 70 connected via a connection cable 70a to the recording/reproduction apparatus. FIG. 3 is a block diagram of the recording/reproduction apparatus 1. As shown in FIG. 3, the recording/reproduction apparatus 1 comprises a CPU 10, a ROM 20, a RAM 30, a hard disk 40, a television unit 50, an output device 60, an input device 80, a recording unit 82 and a communication unit 84 with an antenna 58 connected to the television unit 50 and with a monitor 70 connected to the output device 60.

ROM 20 has stored an initial program that performs various initial setting operations, examines the hardware, and loads required programs. CPU 10 executes the initial program when the power source of the recording/reproduction apparatus is turned on, thereby setting an operating environment of the recording/reproduction apparatus 1.

ROM 20 has further stored various other programs for operation of the recording/reproduction apparatus 1 including a menu display process, various initial setting operations, and a television video display process, other programs for achieving various functions of the recording/reproduction apparatus 1, a main program 202, a recording reservation program 204, a program keyword list reception program 206, a specified setting program 208, and a reproduction program 210.

RAM 30 temporarily stores various programs to be performed by CPU 10, and data involved in the execution of these programs. In this embodiment, RAM 30 has storage areas for an electronic program guide 302, a program keyword list request table 304, set information 306, and a reproduction keyword group 308.

The electronic program guide 302 comprises a program table of a digital broadcast (or a list of programs to be broadcasted). CPU 10 separates data on an electronic program guide 820 included in the digital broadcast received from the broadcasting station 800, and stores it as the electronic program guide 302 on RAM 30. The electronic program guide 302 itself is well known and further description thereof will be omitted.

The program keyword list request table 304 is a table that will be sent from the recording/reproduction apparatus 1 to the service company's server 900 when the recording/reproduction apparatus 1 requests a program keyword list from the service company's server 900. FIG. 4 illustrates one example of a data structure of the table 304. As shown, the table 304 comprises as items a user ID (for example, of "1200354"), a title (for example, of "soccer game relay"), a channel No. (for example, of "4"), a date (for example, of "Jan. 2, 2004"), a program start time (for example, of "19:00"), a program end time (for example, of "21:00"), a keyword level (for example, of "1"), and a specified keyword list (for example, of "goal, shoot, team A, . . . "). In the following description, information which comprises the user ID, title, channel, date, program start time, and program end time is referred to as "program information" as occasion demands.

The aforementioned items included in the program keyword list request table 304 will be described briefly. The user ID is a key determined uniquely to specify the user. The service company's server 900 refers to the user ID to identify the user or viewer (that uses the recording/reproduction apparatus 1). The title, channel, date, program start time, and program end time relate to the program whose recording is reserved in the video recording reservation process.

The keyword level is a level of a keyword that will be required by the viewer. For example, in the case of a keyword for the soccer game program, a level "1" indicates a general keyword (for example, of "goal" or "shoot") and a level "2" a keyword (for example, of "through pass" or "intercept") for persons who like soccer games. While the present embodiment is described on assumption that the service company's server 900 has stored a plurality of keyword levels and a like number of keywords in corresponding relationship, the present invention is not limited to this particular case.

The set information 306 comprises information on setting of the recording/reproduction apparatus 1. FIG. 5 illustrates one example of a data structure of the set information 306. As shown, the set information 306 comprises a reproduction mode (for example, of "whole reproduction"), a reproduction flag (for example, of "on"), a reproduction keyword group name (for example, of "highlight"), a reproduction keyword, and a matching criterion keyword.

The respective items of the set information 306 will be described briefly although they will be described in greater detail later. The reproduction mode is represented by data that will be referred to when the recording/reproduction apparatus 1 reproduces program data, and set in the setting process. The reproduction flag is used to determine whether or not the recording/reproduction apparatus 1 is under reproduction of program data 402, and represented by either "on" or "off". The reproduction group is a group name to be referred to when the reproduction mode is set as "group reproduction". The reproduction keyword is one to be referred to when the reproduction mode is set as "keyword reproduction". The matching criterion keyword is a criterion keyword with which a keyword involved in the program will be compared directly when CPU 10 reproduces the program data. When the keyword involved in the program matches the criterion keyword, the program will be reproduced.

FIG. 6 illustrates one example of a data structure of the reproduction keyword group 308. As shown, the group 308 comprises a plurality of group names (for example, of "team A") and a like number of groups of keywords (for example, of "team A, players X and Y, manager O") set in corresponding relationship. While in the embodiment it is assumed that the plurality of group names and the like number of groups of keywords are beforehand set in corresponding relationship, a keyword may be set, for example, by the user's inputting operation or extracted from a program keyword list 404 received from the service company's server 900.

The hard disk 40 has stored programs and data files to be used in the recording/reproduction apparatus 1 such as recorded video data 400 and candidate keyword data 406.

The recorded video data 400 comprises a plurality of pairs of program data 402 and a program keyword list 404 stored in corresponding relationship on the hard disk 40. The program data 402 comprises the content of the program data 810 received from the broadcasting station 800. The program keyword list 404 comprises the program keyword list 920 received from the service company's server 900.

One of the well-known moving picture storage methods such as MPEG (Moving Picture Experts Group) and AVI (Audio-Video Interleaved file) is used to store the program data 402.

The program keyword list 404 comprises a plurality of time zones, a like number of program data sections, and a like number of groups of keywords in corresponding relationship. FIG. 7 illustrates a data structure of the program keyword list 404 that includes program information, information on the latest whole keyword scene received and information on a plurality of keyword scenes 1, 2, 3, . . . .

The program information comprises a user ID (for example, of "1200354"), a date (for example, of "Jan. 2, 2004"), a title (for example, of "soccer game relay"), a channel (for example, of "4"), a start time (for example, of "19:00"), and an end time (for example, of "21:00") of the program.

The latest whole keyword scene comprises an index number (for example, of "1"), a total keyword-scene time (for example, of "0:50:10"), a total number of extracted keywords (for example, of "150"), an extracted keyword level (for example, of "1"), an extracted keyword list (for example, of "goal, shoot, . . . ") and the frequencies of emergence of respective extracted keywords (for example, of 3 times for "goal", 10 times for "shoot").

Each keyword scene further comprises a start time (for example, of "19:00:00") and an end time (for example, of "19:00:15") thereof, and the number of keywords (for example, of "2") included in the scene, and a keyword list (for example, of "program start, game start") of that scene.

Now, the respective items will be outlined. First, the program information is the same as that stored on the program keyword list request table 304 and used to identify the corresponding keyword list.

Then, the items included in the latest whole keyword scene information will be described. The index number (i) represents that the keyword list was received an i-th time in the same program. CPU 10 refers to the index number to determine which of the received program keyword list 920 and the program keyword list 404 is newer. The total keyword-scene time represents the sum of reproduction times of the respective keyword scenes. The total number of extracted keywords represents the total number of extracted keywords stored. The extracted-keyword level represents a level of the extracted keyword and is the same as the corresponding one stored on the program keyword list request table 304. The frequency of emergence of each extracted keyword represents the number of times the keyword was emerged or extracted.

Further, the items of each keyword scene will be described. The start and end times relates to a time zone for the appropriate keyword scene. The number of keywords represents ones involved in the appropriate keyword scene. The keyword list is composed of keywords involved in the keyword scene.

The candidate keyword storage area 406 has stored candidate keywords from which the viewer can select a desired keyword to be inputted. CPU 10 can additionally store the keywords included in the program keyword list 404 as candidates in the area 406.

CPU 10 performs a process based on a program selected in accordance with an input instruction, thereby transferring instructions and data to the functional sections concerned. More specifically, CPU 10 reads a relevant program stored in ROM 20 in accordance with an operation signal received from the input unit 80 and performs a process specified by the program, outputs a display control signal to the video output unit 64 as required, and displays a result of the processing on the monitor 70.

In this embodiment, CPU 10 performs a main process (shown in FIG. 8) in accordance with a main program 202 stored in ROM 20. In the main process, CPU 10 reads a video recording reservation program 204 to perform a video recording reservation process (shown in FIG. 9), reads a program keyword list reception program 206 to perform a program keyword list reception process (see FIG. 10), reads a setting program 208 to perform a setting process (see FIG. 11), and reads a reproduction program 210 to perform a reproduction process (see FIG. 12), as the respective subroutines.

More specifically, in the main process CPU 10 performs an initializing process and the video recording reserving process. When the present time is in the video recording reservation time, CPU 10 performs a video recording process. Further, CPU 10 performs the program keyword list reception process, the setting process, the reproduction process, and other processes. Then, CPU 10 repeats the looping process starting with the video recording reservation process.

When the viewer has reserved recording a program in the video recording reservation process, CPU 10 prompts the viewer to input a keyword level and a desired specified keyword. Then, CPU 10 creates a program keyword list request table 304 that comprises these data and information on the reserved program and then sends it to the service company's server 900.

When CPU 10 has received the program keyword list 920 from the service company's server 900 in the program keyword list reception process, CPU 10 determines whether the same program information as that in the program keyword list 920 is stored in the program keyword list 404. If not, CPU 10 stores the program keyword list 920 as a new list 404 on the hard disk 40. If the same program information is already stored in the program keyword list 404, CPU 10 compares the index number of the program keyword list 920 with that of the program keyword list 404. If the former is larger than the latter, CPU 10 updates the program keyword list 404 with the list 920 and stores the updated data. CPU 10 then stores the extracted keywords included in the program keyword list 404 as candidate ones in the candidate keyword storage area 406.

When the set switch 80c is turned on in the setting process, CPU 10 prompts the viewer to select the reproduction mode. Then, CPU 10 determines a matching criterion keyword in the reproduction mode and stores it in the setting information storage area 306.

If the reproduction switch 80a is turned on when the reproduction flag is off in the reproduction process, CPU 10 reads the program keyword list 404. Then, CPU 10 determines a scene where one of the keywords of the keyword lists included in the program keyword list 404 matches the criterion keyword stored in the setting information storage area 306, and starts to sequentially reproduce the scenes at the scene.

The television unit 50 receives a digital television broadcast and comprises a tuner 52, an OFDM (Orthogonal Frequency Division Multiplexing) demodulator 54, and a decoder 56 with the tuner 52 connected to an antenna 58.

The tuner 52 is tuned along with the antenna 58 so as to receive an OFDM signal having the frequency of a channel (or broadcast station) specified by the viewer.

The OFDM demodulator 54 demodulates an OFDM signal received from the tuner 52. More specifically, it performs an A-to-D (Analog to Digital) conversion on the received OFDM signal to provide a digital signal, which is then subjected to a synchronizing process, an FFT (Fast Fourier Transform) process and an error correction process, thereby extracting a TS (Transport Stream) signal.

When a program is viewed, the decoder 56 separates a video signal, a voice signal and a data signal from the TS signal received from the OFDM demodulator 54, decodes the separated voice signal and outputs it to the voice output unit 62. The decoder 56 also decodes the video signal and outputs it to the video output unit 64. The decoder 56 also outputs the data signal to CPU 10. In recording the program, the decoder outputs the respective separated and decoded signals (or video, voice and data signals) to CPU 10. The voice and video signals are encoded in a well-known encoding systems such as MPEG. The decoder 56 decodes the video and voice signals in respective decoding systems corresponding to their encoding systems.

The output unit 60 comprises a voice output unit 62 and a video output unit 64 that outputs a voice signal and a video signal from the television unit 50 under control of CPU 10 with the voice and video output units connected to the monitor 70.

The monitor 70 is a display with a built-in speaker (not shown). The monitor 70 outputs as sound the voice signal outputted from the voice output unit 62 and as videos the video signal outputted from the video output unit 64. The monitor 70 comprises a CRT (Cathode Ray Tube), a LCD (Liquid Crystal Display) or a plasma display.

The input unit 80 comprises (button-shaped) switches necessary to input numerical values and characters and to select functions, and outputs a switch-depressed signal as a command or data to CPU 10.

Referring to FIG. 2, the input unit 80 comprises a reproduction switch 80*a*, a stop switch 80*b*, a set switch 80*c*, and a recording reservation switch 80*d*. When the reproduction switch 80*a* is depressed, CPU 10 reproduces program data 402 stored on the hard disk 40. When the stop switch 80*b* is depressed, CPU 10 stops reproduction of the program data 402. When the set switch 80*c* is depressed, the setting process is performed. When the recording reservation switch 80*d* is depressed, the video recording reservation process is performed. While the input unit 80 is illustrated as comprising the respective switches provided on the recording/reproduction apparatus 1, the present invention is not limited to this particular case. For example, the input unit 80 may be provided, for example, on a transmitter of a remote controller, of course.

The bus 90 is used to cause electric signals such as data from CPU 10 to pass therethrough, and connects CPU 10, ROM 20, RAM 30, hard disk 40, television unit 50, output unit 60, input unit 80, recording unit 82, and communication unit 84.

The recording unit 82 records video data 400 stored on the hard disk 40 on external media such as a video tape, a DVD+R, a DVD-RAM, a CD-R or Blue-ray Disk. Recorded video data 400 may be stored in a data storage area provided on the hard disk 40.

The communication unit 84 is used when the recording/reproduction apparatus 1 communicates with the service company server 900 via the network 3. Specifically, the communication unit comprises a modem and a LAN card.

<Flow of the Processing>

Figure 8:
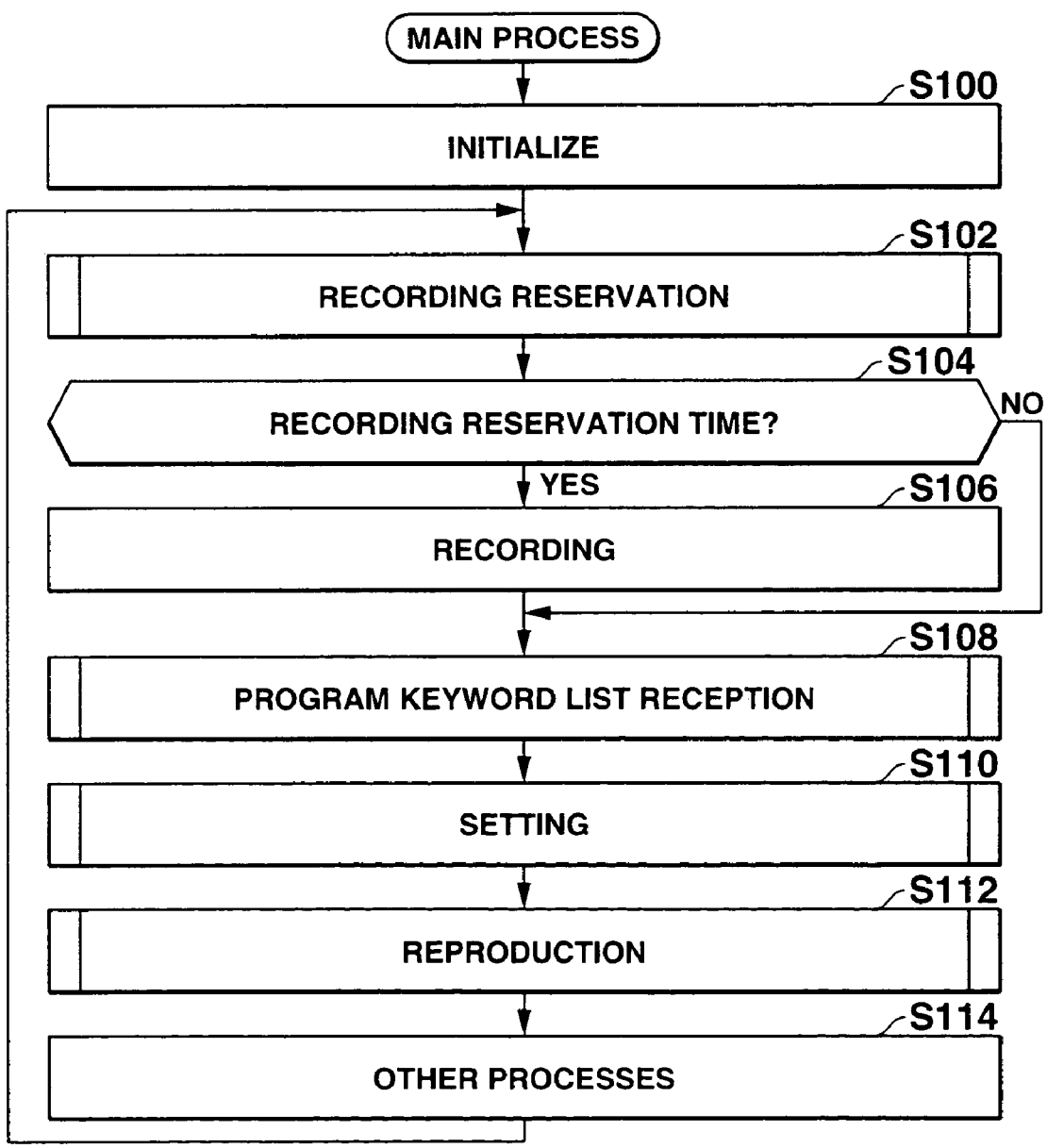
FIG. 8 shows a flow of a main process in the first embodiment.

First, the main process will be described with respect to the FIG. 8 flowchart. CPU 10 performs the main process by executing the main program 202 stored in ROM 20.

First, CPU 10 performs the initializing process (step S100). In this process, CPU 10 initializes the respective devices and set values, receives an electronic program guide 820 from the broadcasting station 800, and stores it as an electronic program guide 302 in RAM 30.

Then, CPU 10 performs the recording reservation process (step S102). If the present time is in the recording reservation time (Yes in step S104), CPU 10 performs the recording process (step S106). More specifically, CPU 10 stores the program data 810, received from the broadcasting station 800, as program data 402 on the hard disk 40.

Then, CPU 10 performs the program keyword list reception process (step S108), the setting process (step S110), and the reproduction process (step S112) sequentially. Further, when CPU 10 has performed other processes, for example, including clock setting process and a channel reception setting process (step S114), CPU 10 repeats the looping process starting with step S102.

Figure 9:
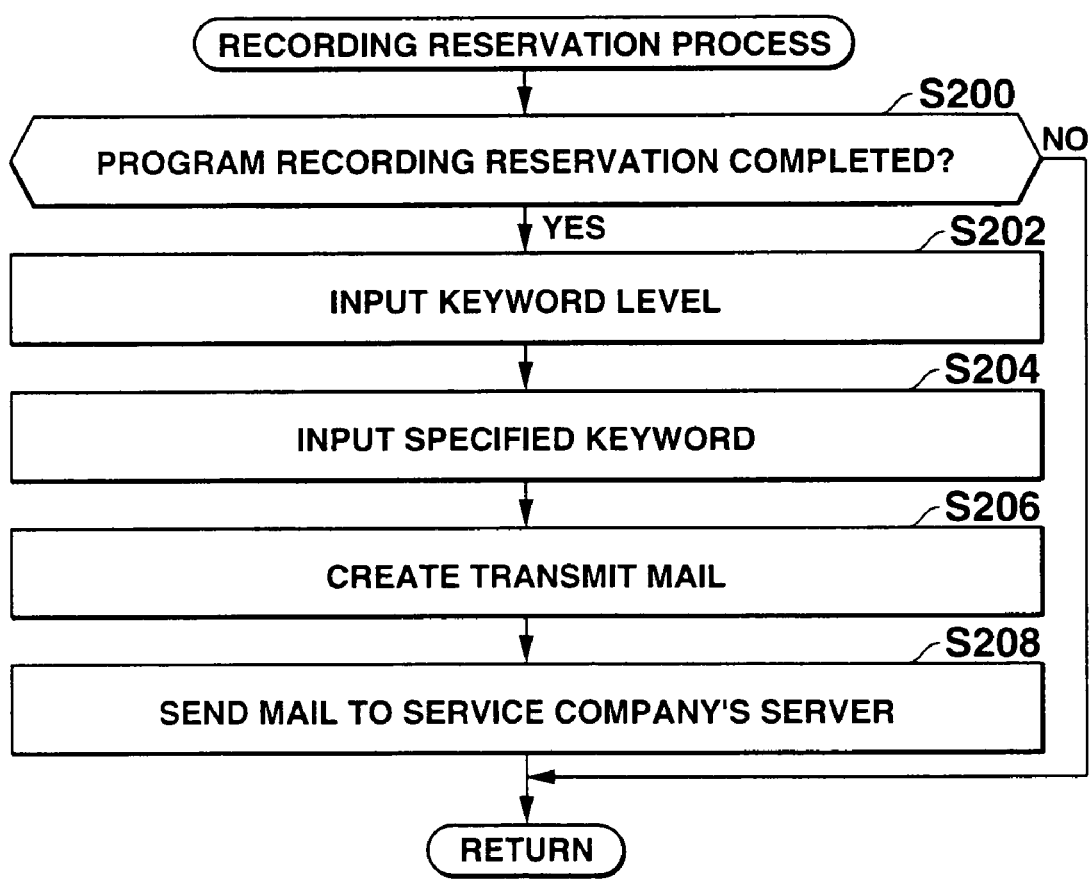
FIG. 9 shows a flow of a recording reservation process to be performed in the first embodiment.

The video recording reservation process will be described next with respect to the FIG. 9 flowchart. CPU 10 performs this process by executing the recording reservation program 204 stored in ROM 20.

CPU 10 determines whether or not the program recording reservation has been completed (step S200). Herein, the program recording reservation is performed as follows: when the program recording reservation is selected by the viewer (or user), CPU 10 displays the electronic program guide 302 on the monitor 70. When the viewer selects a program whose recording is to be reserved, CPU 10 reserves recording the selected program. More specifically, when CPU 10 stores on the program keyword list request table 304 the title (for example, of "soccer game relay"), a channel (for example, of "4"), a date (for example, of "Jan. 2, 2004"), a program start time (for example, of "19:00"), and a program end time (for example, of "21:00") of the program selected by the user, the program recording reservation is completed.

When CPU 10 determines that the recording reservation has not been completed (No in Step S200), CPU 10 terminates the recording reservation process and returns its processing to the main process.

When the program recording reservation is completed (Yes in step S200), CPU 10 causes the viewer to input a keyword level (step S202). The CPU 10 then stores the inputted keyword level on the program keyword list request table 304.

Then, CPU 10 causes the viewer to input a specified keyword and then stores this keyword on the program keyword list request table 304 (step S204). The specified keyword may be keyed in directly or selected from among the candidate keywords stored in the candidate keyword storage area 406.

Then, CPU 10 creates a transmit mail based on the request table 304 (step S206), and then sends the mail to the service company server 900 (step S208).

While in the video recording reservation process the program keyword list request table 304 is illustrated as transmitted by mail, the present invention is not limited to this particular case. For example, another method may be used to send/receive data to/from the service company's server 900. For example, data may be transmitted to the server using the FTP (File Transfer Protocol) or HTTP (HyperText Transfer Protocol).

Figure 10:
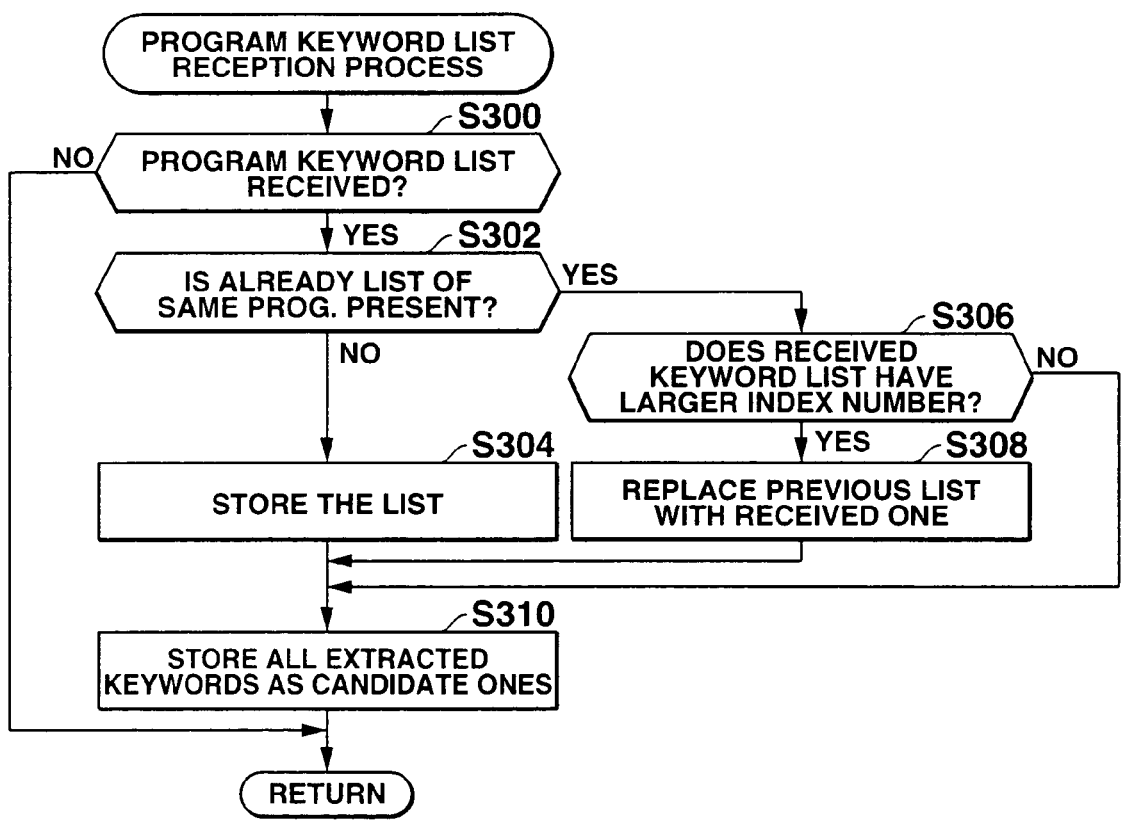
FIG. 10 shows a flow of a program keyword list receiving process to be performed in the first embodiment.

Then, the program keyword list reception process will be described with respect to a flowchart of FIG. 10. This process is performed when CPU 10 executes the program keyword (KW) list reception program 206 stored in ROM 20.

First, CPU 10 determines whether a program keyword list 920 is received. If not (No in step S300), CPU 10 terminates this process and returns its processing to the main process.

When the program keyword list 920 is received (Yes in step S300), CPU 10 determines whether the program keyword list 404 of the same program as for the keyword list 920 has been stored on the hard disk (step S302). More specifically, CPU 10 determines whether the program information on the received program keyword list 920 is the same as that stored in the program keyword list 404 stored on the hard disk 40.

If not (No in step S302), CPU 10 replaces the program keyword list 404 with the received program keyword list 920 (step S304).

If so (Yes in step S302), CPU 10 compares the index number of the received program keyword list 920 with that of the program keyword list 404 to see whether the former is larger than the latter (step S306). If so (Yes in step S306), CPU 10 replaces the program keyword list 404 with the received list 920 (step S308).

Then, CPU 10 stores all the extracted keywords included in the program keyword list 404 as candidate keywords in the candidate keyword storage area 406 (step S310). Then, CPU 10 terminates the program keyword list reception process and returns its processing to the main process.

Figure 11:
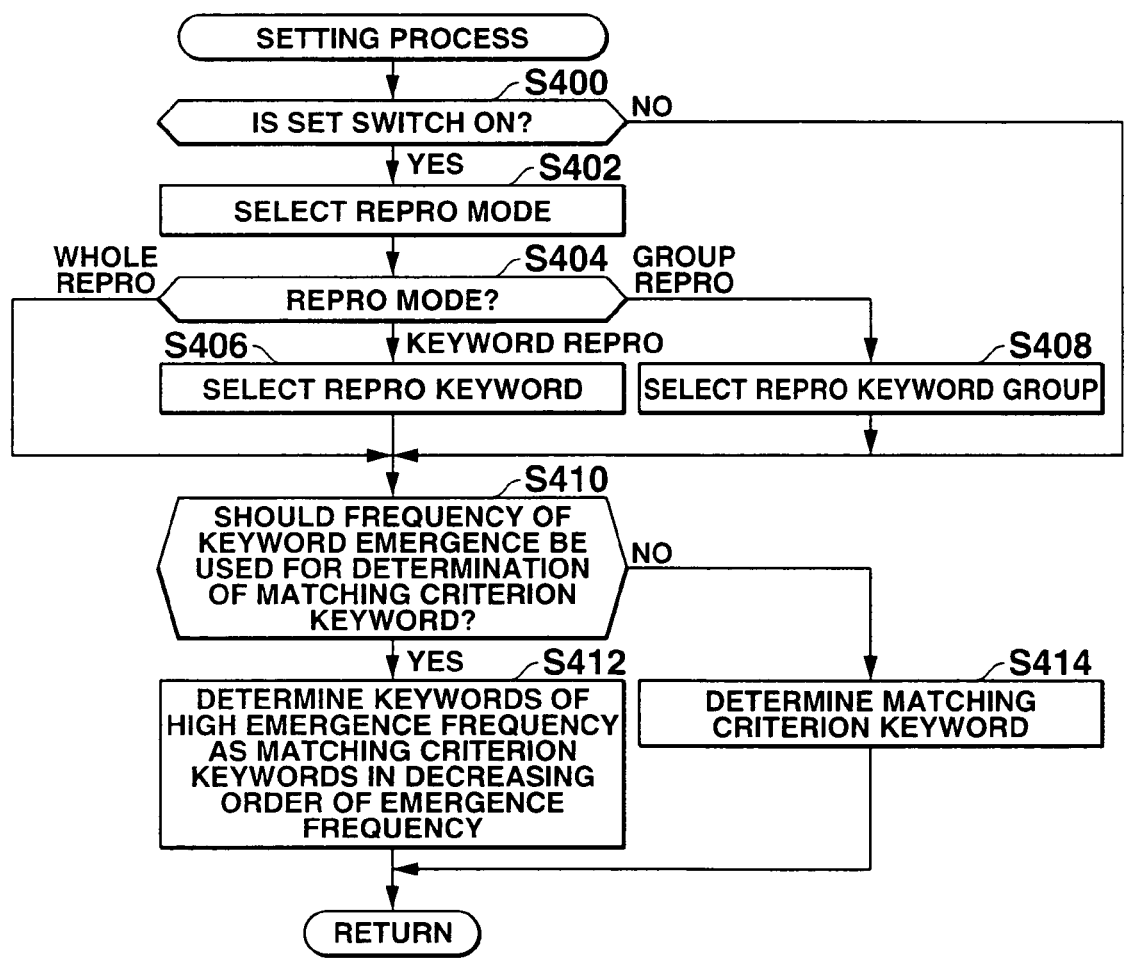
FIG. 11 shows a flow of a setting process to be performed in the first embodiment.

Next, the setting process will be described with respect to the flowchart of FIG. 11. The setting process is performed when CPU 10 executes the setting program 208 stored in ROM 20.

First, CPU 10 determines whether the set switch 80c has been depressed (step S400). If so (Yes in step S400), CPU prompts the viewer to select a reproduction mode (in block R300 of FIG. 15) (step S402).

Figure 15:
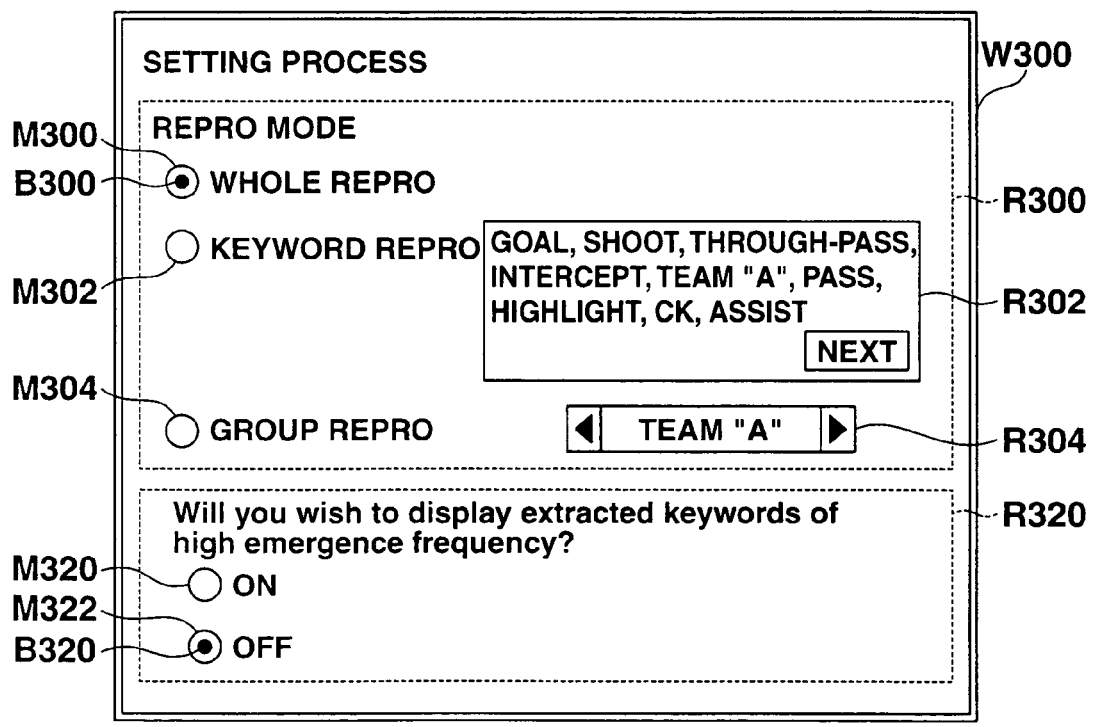
FIG. 15 shows a picture example appearing in the setting process to be performed in the first embodiment.

If the user selects a "keyword reproduction" as one of the reproduction modes (keyword reproduction in step S404), CPU 10 causes the viewer to select a desired one from a reproduction keyword group R302 in FIG. 15 and stores it in the set information storage area 306 (step S406). When a "group reproduction" is selected as the reproduction mode (group reproduction in step S404), CPU 10 causes the viewer to select a desired reproduction group from a block R304 and then stores it in the set information storage area 306.

Then, CPU 10 determines whether the frequencies of emergence or extraction of the keywords should be used for determination of criterion keywords (step S410). If not (No in step S410), CPU 10 determines criterion keywords as shown below and stores them in the set information storage area 306 (step S414).

In order to determine a matching criterion keyword, the following method is usable. First, CPU 10 reads out a reproduction mode from the set information storage area 306. If the reproduction mode is "whole reproduction", CPU 10 stores all the extracted keywords stored in the program keyword list 404 as they are as the criterion keywords in the set information storage area 306. If the reproduction mode is "keyword reproduction", CPU 10 stores the reproduction keyword stored in the set information storage area 306 as the matching criterion keyword. If the reproduction mode is "group reproduction", CPU 10 reads the name of the reproduction group stored in the set information storage area 306 and then reads a desired keyword from among the reproduction keyword group storage area 308 and stores it as the matching criterion keyword.

When use of the frequencies of emergence are set (Yes in step S410), CPU 10 determines the matching criterion keywords to be used, in decreasing order of frequency of emergence and stores them in the set information storage area 306 (step S412).

Then, CPU 10 terminates the setting process and returns its processing to the main process.

Figure 12:
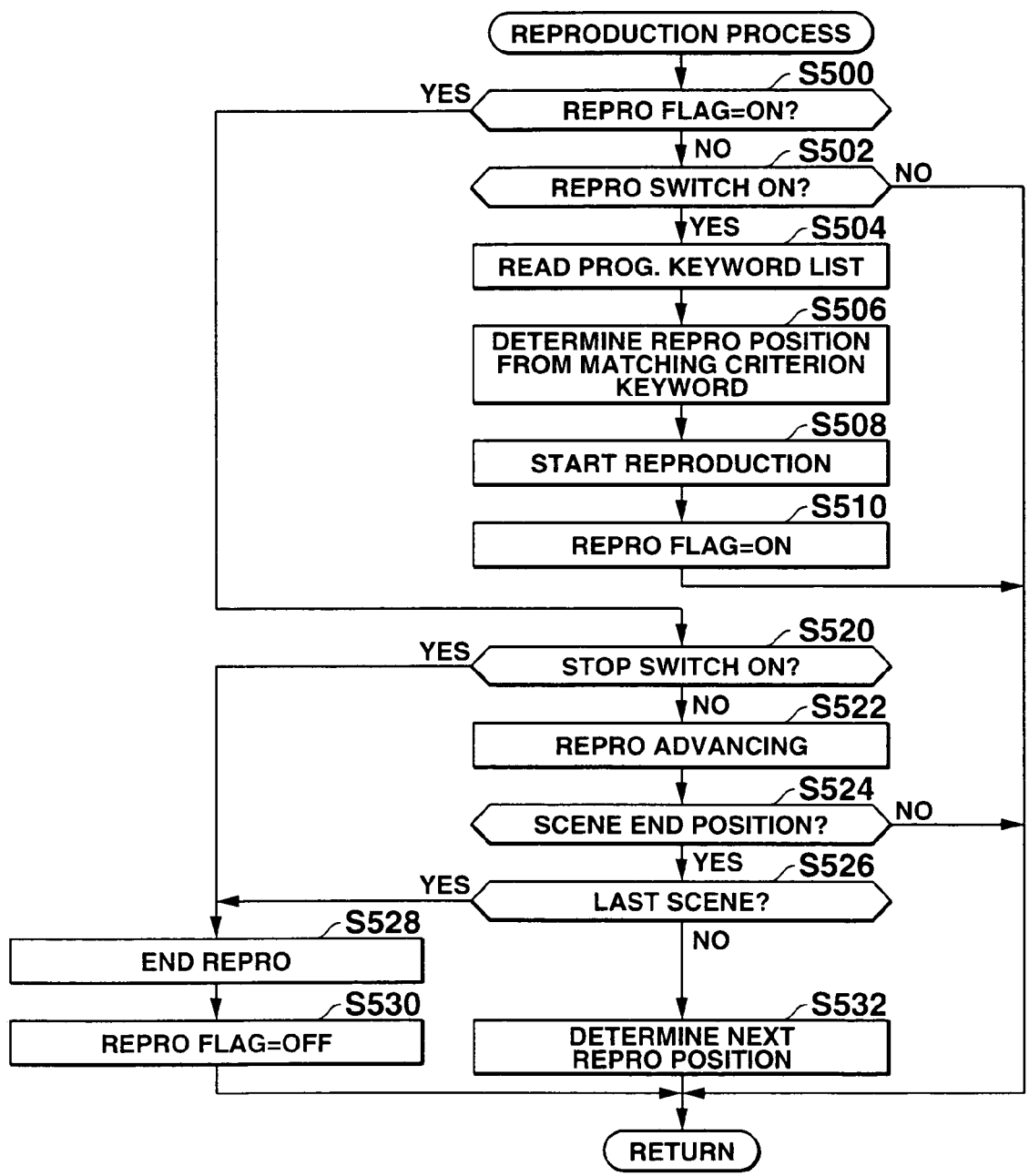
FIG. 12 shows a flow of a reproduction process to be performed in the first embodiment.

Next, the reproduction process will be described with respect to a flowchart of FIG. 12. This process is performed when CPU 10 executes the reproduction program 210 stored in ROM 20.

First, CPU 10 determines whether the reproduction flag stored in the set information storage area 306 is on (step S500). If not (No in step S500), CPU 10 determines whether the reproduction switch 80a has been depressed (step S502). If so (Yes in step S502), CPU 10 reads the program keyword list 404 (step S504). Then, CPU 10 reads a start time of a keyword scene where the criterion keyword stored in the set information 306 storage area matches one of the keywords involved in the keyword scenes stored in the program keyword list 404 and determines it as the reproduction start time (step S506). Then, CPU 10 starts to reproduce the keyword scene at the determined reproduction time (step S508), and turns on the reproduction flag stored in the set information storage area 306 (step S510).

If the reproduction flag is on (Yes in step S500), CPU 10 determines whether the stop switch 80b has been depressed (step S520). If not (No in step S520), CPU 10 performs a reproduction advancing process (step S522). When the reproduction is not at the time when the keyword scene ends (No in step S524), CPU 10 returns its processing to the main process.

If the reproduction is at the time when the scene ends (Yes in step S524), CPU 10 determines whether the scene is the last one (step S526). If not (No in step S526), CPU 10 reads a time when a scene involved in the next keyword starts and determines it as its reproduction start time (step S532).

When the stop switch 80b has been depressed (Yes in step S520) or when the scene reproduced is the last one (Yes in step S526), CPU 10 terminates the reproduction process (step S528), and stores the reproduction flag as off (step S530).

<Examples of Picture>

Figure 13:
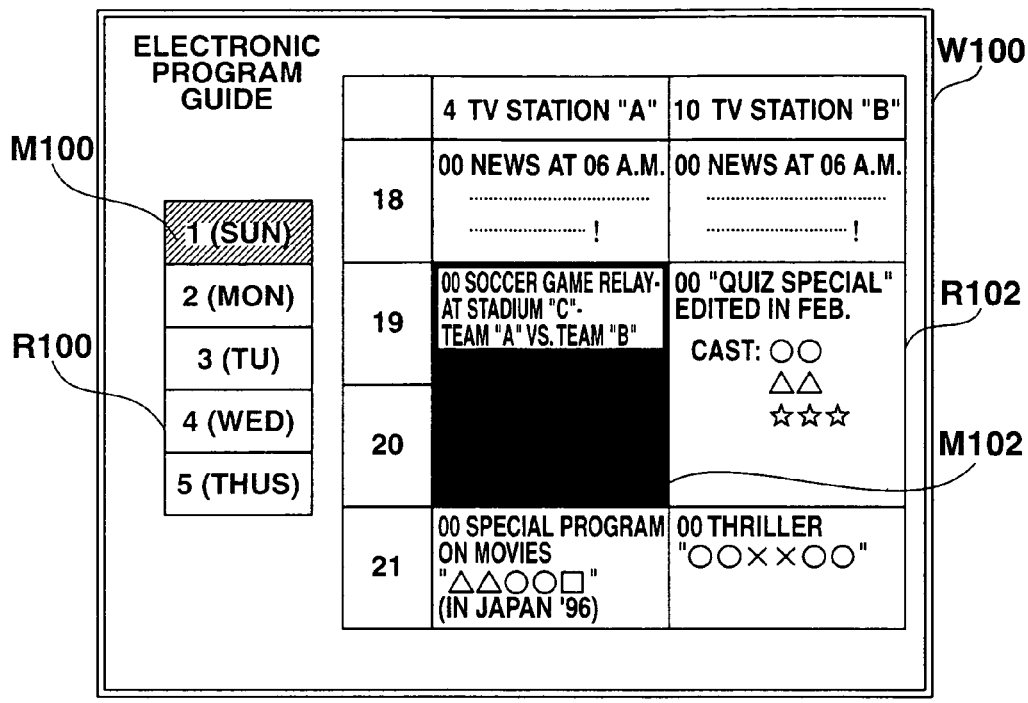
FIG. 13 shows a picture example appearing in a recording reservation process to be performed in the first embodiment.

Next, pictures to be displayed on the monitor 70 of the recording/reproduction apparatus 1 will be described with reference to the drawings. FIG. 13 shows an electronic program guide 302 displayed as a display picture W100 on the monitor 70. CPU 10 displays a date area R100 indicative of a recording day on the display picture W100. When the user selects a day "1 (Sunday)", the data is displayed emphatically as shown by M100 and an electronic program guide R102 that represents the content of the day "1 (Sunday)" television program in the form of a table is displayed to the right of the picture. When the user selects the program "soccer game relay", CPU 10 stores a title "soccer game relay", a channel "4", a date "Jan. 2, 2004", a start time "19:00" and an end time "21:00" of the game on the program keyword list request table 304.

Figure 14:
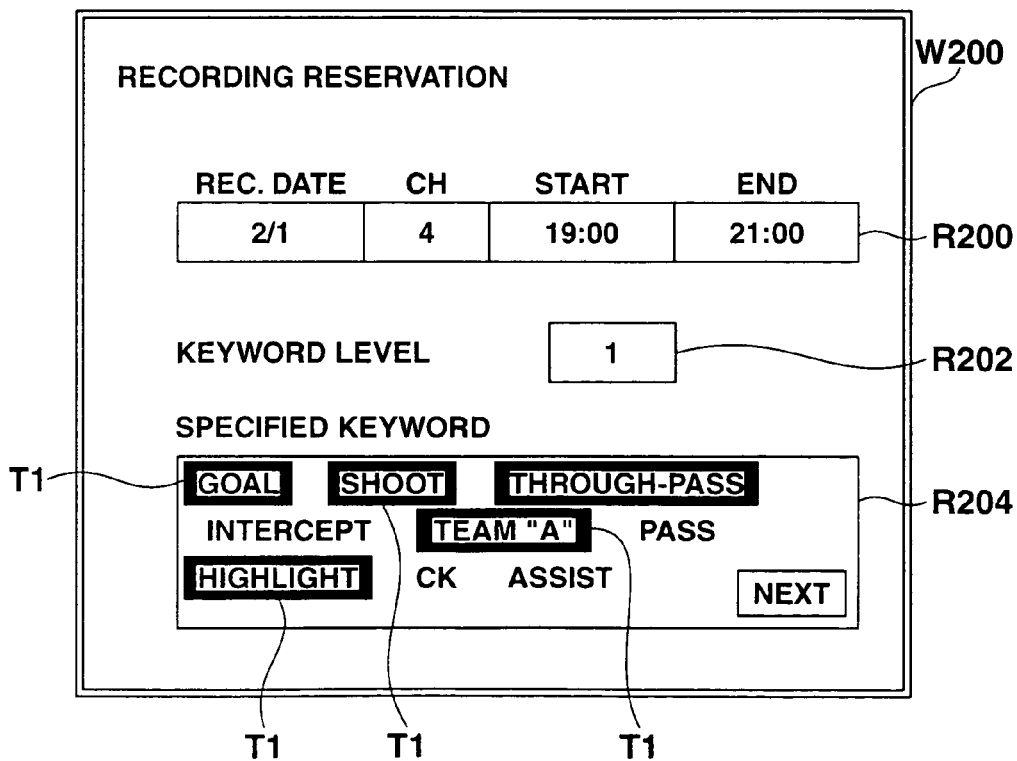
FIG. 14 shows another picture example appearing in the recording reservation process to be performed in the first embodiment.

FIG. 14 illustrates one example of a picture for program recording reservation displayed as a display picture W200 on the monitor 70 after the program was selected in FIG. 13. CPU 10 displays in an area R200 the recording date, channel, recording start time, and recording end time included in the selected program. Then, CPU 10 causes the viewer to input a desired keyword level to the area R202 (step S202 of FIG. 9). Then, CPU 10 displays in an area R204 the candidate keywords stored in the candidate keyword storage area 406, in order to cause the viewer to select desired keywords from among them. When the viewer (or user) has selected the desired keywords, CPU 10 gives emphasized indication T1 to the selected keywords and stores them as the components of the specified keyword list on the program keyword list request table 304 (step S204 in FIG. 9).

FIG. 15 illustrates one example of a display picture W300 displayed on the monitor 70 in the setting process. CPU 10 displays in an area R300 "whole reproduction" (shown by M300), "keyword reproduction" (shown by M302), and "group reproduction" (shown by M304) as the reproduction modes one of which can be selected. When the user selects the "whole reproduction" by a button B300, CPU 10 stores the "whole reproduction" in the reproduction mode in the set information storage area 306.

Further, CPU 10 displays prompts the viewer to select one of "on" (shown by M320) and "off" (shown by M322) to determine whether or not keywords having high emergence frequencies should be displayed in an area R320 to determine matching criterion keywords to be used. When the user selects "off" by a button B320, CPU 10 performs the criterion keyword determination step S414 of FIG. 11.

Figure 16:
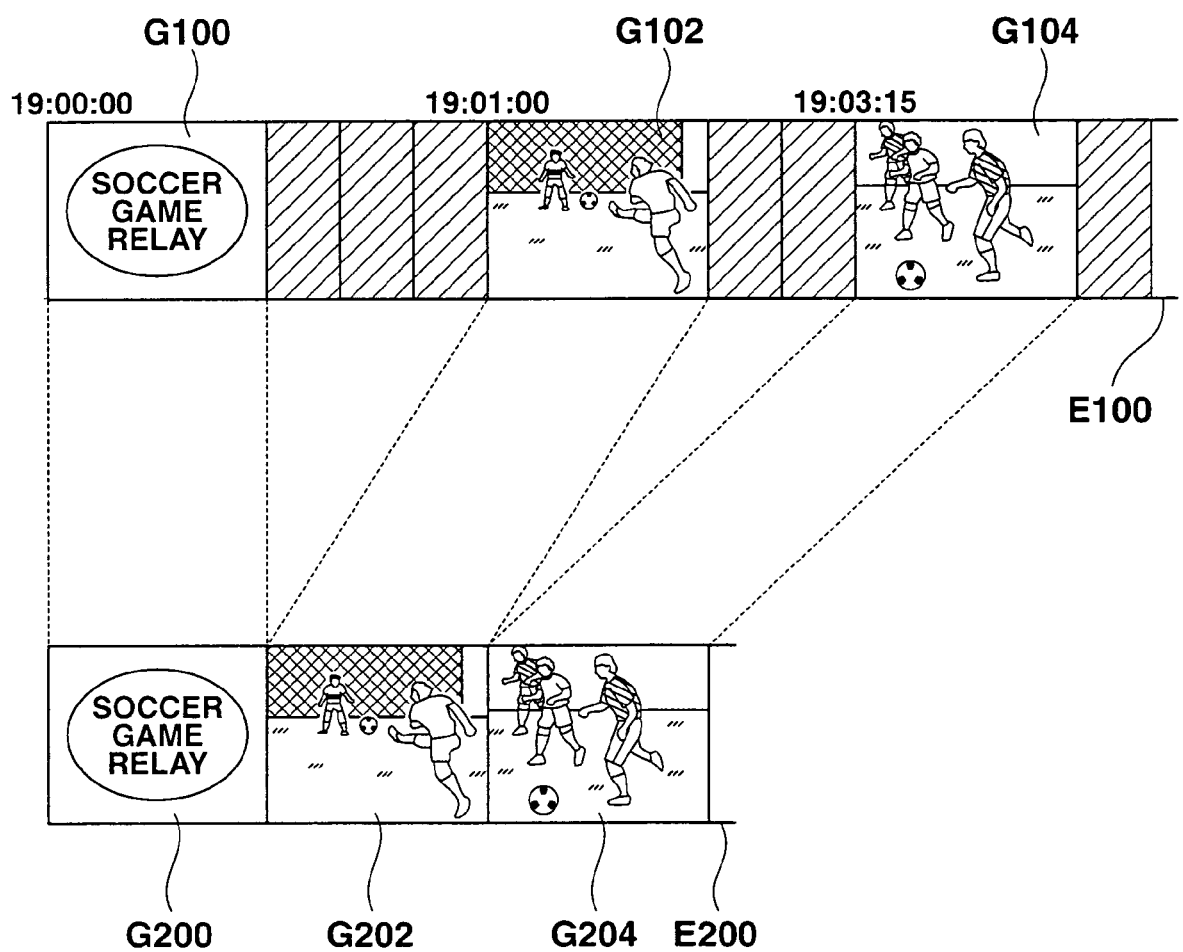
FIG. 16 illustrates reproduction of a video in the first embodiment.

FIG. 16 schematically illustrates an actual video. A video E100 is the content of the program data 402 stored. In FIG. 16, a program "soccer game relay" has been stored for two hours from 19:00 o'clock. CPU 10 determines that keyword scenes G100, G102 and G104 correspond to the matching criterion keyword.

The video E200 schematically illustrates the pictures of the soccer game displayed on the monitor 70. CPU 10 extracts scenes corresponding to the matching criterion keyword and reproduces them as scenes G200, G202 and G204, sequentially.

Thus, the user is not required to reproduce all the program data 402, but can view only scenes involving the set keyword.

Second Embodiment

The second embodiment relates to a recording/reproduction apparatus that records a program of a digital broadcast and reproduces the recorded program efficiently at an appropriately controlled speed.

<Structure>

Figure 17:
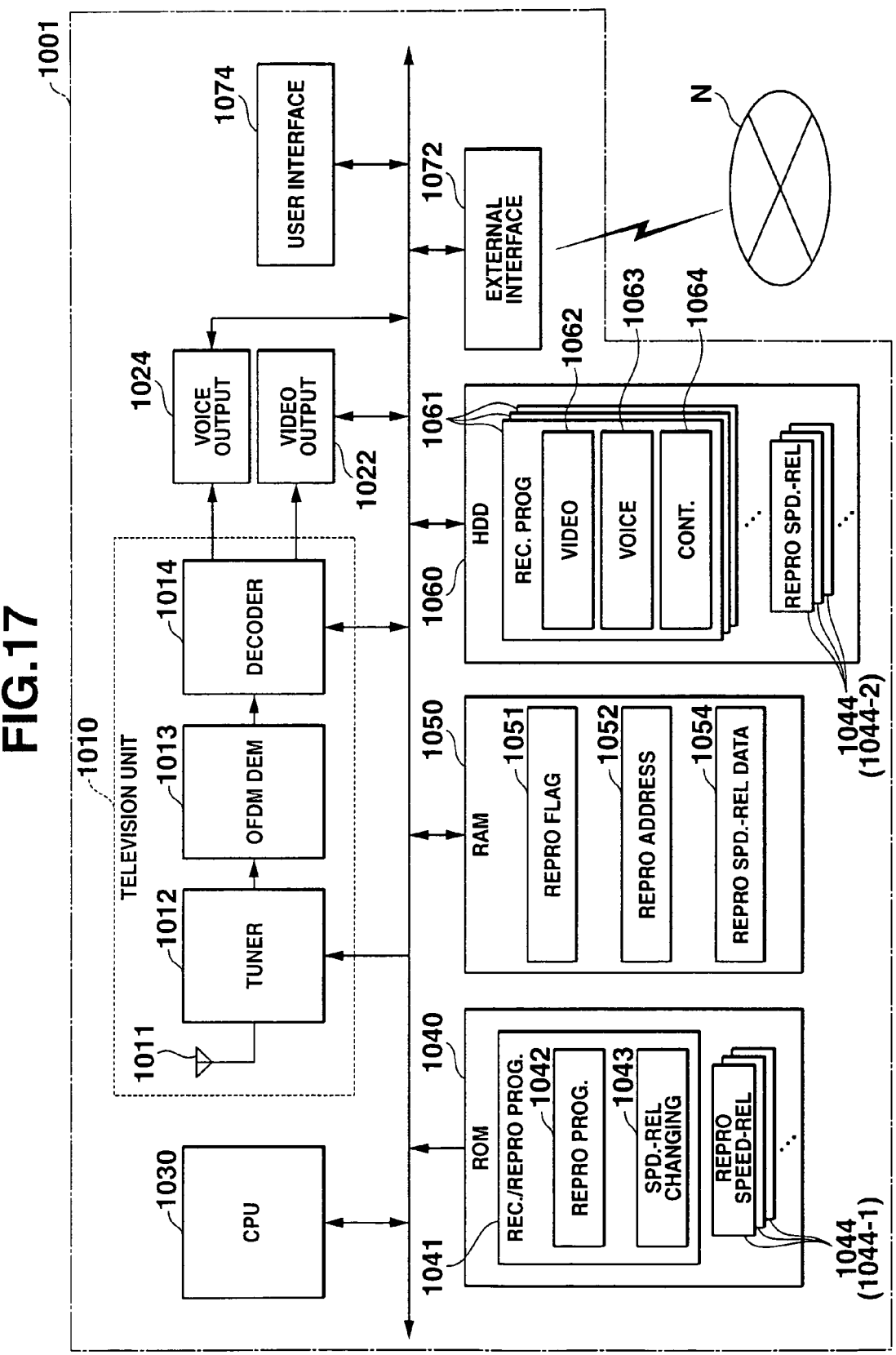
FIG. 17 is a block diagram of a circuit of a recording/reproduction apparatus as a second embodiment of the present invention.

FIG. 17 is a block diagram of a circuit of a recording/reproduction apparatus 1001 as a second embodiment. As shown, the recording/reproduction apparatus 1001 comprises a television unit 1010, a video display 1022, a voice output unit 1024, a CPU 1030, a ROM 1040, a RAM 1050, a HDD 1060, an external interface 1072, and a user interface 1074.

The television unit 1010 receives a digital television broadcast and comprises an antenna 1011, a tuner 1012, an OFDM (Orthogonal Frequency Division Multiplexing) demodulator 1013, and a decoder 1014 with the tuner 1012 connected to an antenna 1011.

The tuner 1012 is tuned along with the antenna 1011 so as to receive an OFDM signal having the frequency of a channel (or broadcast station) specified by the viewer.

The OFDM demodulator 1013 demodulates an OFDM signal received from the tuner 1012. More specifically, it performs an A-to-D (Analog to Digital) conversion on the received OFDM signal to provide a digital signal, which is then subjected to a synchronizing process, an FFT (Fast Fourier Transform) process and an error correction process, thereby extracting a TS (Transport Stream) signal.

When a program is viewed, the decoder 1014 separates a video signal, a voice signal and a data signal from the TS signal received from the OFDM demodulator 1013, decodes the separated voice signal and outputs it to the voice output unit 1024. The decoder 1014 also decodes the video signal and outputs it to the video output unit 1022. The decoder 1014 also outputs the data signal to CPU 1030. In recording the program, the decoder outputs the respective separated and decoded signals (or video, voice and data signals) to CPU 1030. The voice and video signals are encoded in a well-known encoding systems such as MPEG. The decoder 1014 decodes the video and voice signals in respective decoding systems corresponding to their encoding systems.

The video display 1022 includes, for example, an LCD, a PDP, an ELD or a CRT so as to display videos based on video signals of a digital terrestrial television broadcast received from the decoder 1014. In the reproduction of the recorded program, the video display 1022 displays videos based on video data 1062 included in the recorded program data 1061 read out from the HDD 1060.

The voice output unit 1024 comprises, for example, a speaker (not shown) that, when a program is viewed, outputs voices based on the voice signals of the digital terrestrial television broadcast received from the decoder 1014. In the reproduction of the recorded program, the voice output unit 1024 outputs voices based on voice data 1063 included in the recorded program data 1061 read out from HDD 1060.

That recording/reproduction apparatus 1001 may not comprise the video display 1022 and the voice output unit 1024. In this case, the recording/reproduction apparatus 1001 needs to be connected to a video display and voice output unit of a television by a cable such that the video and voice signals separated and decoded by the decoder 1014 are outputted via the cable to the video display and voice output unit.

Figure 18:
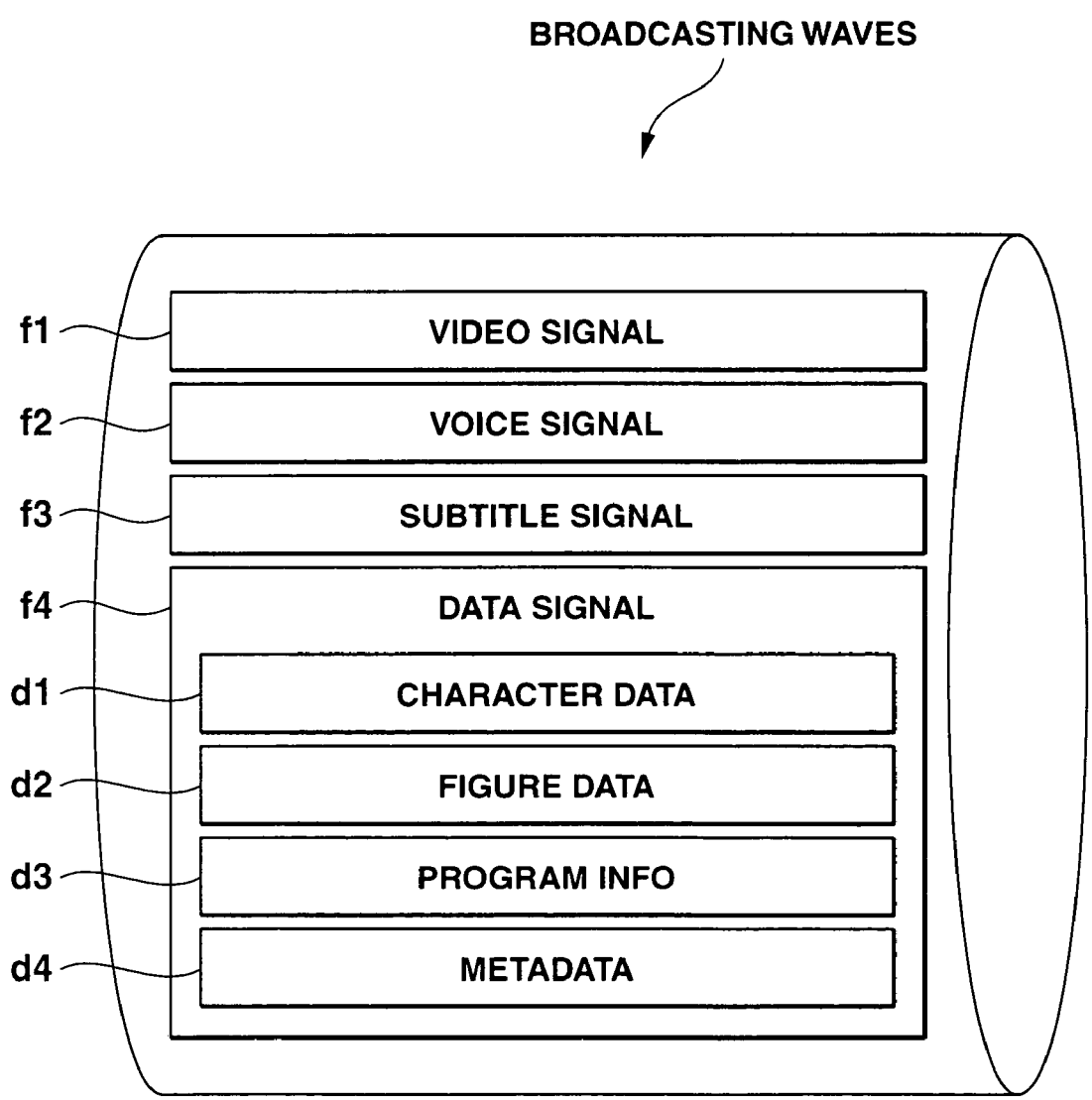
FIG. 18 schematically illustrates the composition of broadcasting waves involved in a digital terrestrial television broadcast in the second embodiment.

As shown in FIG. 18, in the digital broadcast of the digital terrestrial television broadcast a plurality of signals such as a video signal f1, a voice signal f2, a subtitle signal f3 and a data signal f4 are transmitted in a multiplexed manner. The data signal f4 comprises character data d1, figure data d2, still picture data, moving picture data, program information (or EPG) d3, and metadata d4 to provide a data broadcast (independent from or dependent on the program). The metadata d4 complements the program and includes various information on the attributes and ID of the program, and other detailed content of the program. It is in the form of text data. In this embodiment, the reproduction speed of the recorded program is controlled based on the metadata d4.

In FIG. 17, CPU 1030 reads out a relevant program from ROM 1040 at a predetermined time or dependent on a signal received from the user interface 1074, develops it in RAM 1050, and then gives relevant instructions and data to the components concerned of the recording/reproduction apparatus 1001 based on the program. In this embodiment, CPU 1030 performs a process for recording the received digital terrestrial broadcast program, a process for reproducing the recorded program, and a process for updating the reproduction speed-related data.

In the recording process, CPU 1030 records the program selected by the viewer. In this case, the "recording" of the program is to store or record videos and voices involved in the received digital terrestrial television broadcast. During the reception of the selected program, CPU 1030 stores video data 1062 based on the video signal received from the decoder 1014, voice data 1063 based on the voice signal, and content data 1064 based on the data signal, as united recorded program data 1061 on HDD 1060.

The content data 1064 refers to data describing a detailed content of the program with time. FIG. 19 illustrates the structure of the content data 1064 for a program "soccer game relay". As shown, the content data 1064 comprises a broadcasting elapse time 1064a and a corresponding program or scene content 1064b. The broadcasting elapse time 1064a represents a time elapsing from the beginning of the program at "0:00:00" o'clock. The program or scene content 1064b is text data representing the contents of the scenes that compose the program.

During recording of the program, CPU 1030 extracts data indicative of the content of a scene under broadcasting at present from the metadata included in the received data signal, and stores the data thus sequentially extracted and the corresponding broadcast elapse times in corresponding relationship from the beginning of the program, thereby creating the content data 1064 of the program.

In the reproduction process, CPU 1030 reproduces the recorded program selected by the viewer. The "reproduction" of the recorded program refers to outputting the stored videos and voices. That is, CPU 1030 causes the video display 1022 to display video based on video data 1062 included in the recorded program data 1061 selected by the viewer from among the recorded program data 1061 stored on the HDD 1060, and also causes the voice output unit 1024 to output voices based on the voice data 1063. Further, CPU 1030 refers to the content data 1064 and selects a reproduction speed in accordance with the reproduction speed-related data 1044 corresponding to the kind of program to be reproduced.

The reproduction speed-related data 1044 indicates reproduction speeds at any one of which a corresponding program part or scene is reproduced. The reproduction speed-related data 1044 is prepared in ROM 1040 and on HDD 1060 for each of the kinds of programs such as "news", "drama", "song program" and "sports game relay". FIG. 20 illustrates one example of the structure of the reproduction speed-related data 1044, which relates to "soccer game relay". In FIG. 20, the reproduction speed-related data 1044 comprises a plurality of keywords 1044$a$, a like number of reproduction speeds 1044$b$, a like number of program scenes or parts 1044$c$ and a like number of reproduction times 1044$d$ set in corresponding relationship.

The keyword 1044$a$ is one that will be a key to select a reproduction speed and selected among from words considered important in the program. For example, in FIG. 20 the kind of program is "soccer game relay", and words related to the soccer games such as "shoot", "goal" and "kickoff" are selected as the keywords.

Each reproduction speed 1044$b$ is a speed at which a specified program scene or part is reproduced, and is expressed in an integer times the normal reproduction speed. The reproduction speed is set depending on a degree of importance of the program part or its keyword 1044$a$, or a degree of the viewer's desire to view the program or scene part. In the case of a scene (involving its keyword 1044$a$) of a high degree of importance, its reproduction speed 1044$b$ is set to a lower value whereas in the case of a scene of a lower degree of importance, the reproduction speed 1044$b$ is set to a higher value. For example in FIG. 20, the degree of importance of a program part present before a game (or "kickoff") start, during a commercial break or after a game end, or the degree of the viewer's desire to view the program part, is regarded as lower and hence the reproduction speed 1044$b$ is set to a higher value or a higher integer times the normal reproduction speed.

Each program scene or part 1044$c$ is reproduced at a corresponding specified reproduction speed and refers to a program part present, for example, before, in or after a specified scene. "Reproduction time" 1044$d$ represents a period of time for which a corresponding specified program part is reproduced at the specified speed and is indicated in hours, minutes and seconds.

When a recorded program is reproduced, CPU 1030 refers to the content data 1064 included in the recorded program 1061, thereby finding a keyword in the reproduction speed-related data 1044 associated with a desired program part or scene in the content data 1064, and reproduces the program part or scene, at a reproduction speed 1044$b$ of the reproduction speed-related data 1044 corresponding to the keyword for a corresponding specified period of time 1044$d$.

For example, when a recorded program having content data 1064 shown in FIG. 19 is reproduced in accordance with the reproduction speed-related data 1044 of FIG. 20, up to a scene involving a keyword "kickoff" at broadcasting elapse time "0:10:00" from the beginning of the program is reproduced at a "30 times" the normal reproduction speed. A five-minute program part including a scene involving a keyword "shoot" at a broadcasting elapse time "0:20:00" and its previous and following scene parts, that is, from "0:17:30" to "0:22:30" is reproduced at a speed of "one times" the normal reproduction speed.

The reproduction speed-related data 1044 includes first reproduction speed-related data 1044-1 stored beforehand as the initial data in ROM 1040 and second reproduction speed-related data 1044-2 stored on HDD 1060. The second reproduction speed-related data 1044-2 is a modification of the first reproduction speed-related data 1044-1 in ROM 1040. In reproducing the recorded program, the second reproduction speed-related data 1044-2 is used preferentially. That is, first, data on a recorded program to be reproduced is selected from among the second reproduction speed-related data 1044-2 stored on HDD 1060. If no appropriate data is included, new appropriate data is selected from among the first reproduction speed-related data 1044-1 in ROM 1040, and the reproduction speed is controlled in accordance with this selected data 1044.

In the reproduction speed-related data changing process, CPU 1030 changes the content of the reproduction speed-related data 1044, selected by the viewer from among the first reproduction speed-related data 1044-1 stored in ROM 1040, in accordance with the viewer's input instruction and then stores the resulting data as new second reproduction speed-related data 1044-2 on HDD 1060.

ROM 1040 has stored a system program, application programs and data, and especially, a recording/reproducing program 1041 and a plurality of the first reproduction speed-related data 1044-1 involved in the recording/reproduction apparatus 1001.

The recording/reproducing program 1041 is for achieving a recording/reproducing process (see FIG. 21) that composes the main process in the present embodiment. It comprises a reproduction program 1042 that performs a reproduction process (see FIG. 22) and a reproduction speed-related data changing program 1043 that achieves a reproduction speed-related data changing process (see FIG. 24).

RAM 1050 is used as a working area for CPU 1030 and temporarily stores a program and data read from ROM 1040 and data processed by CPU 1030. Especially, in the present embodiment RAM 1050 comprises a reproduction flag storage area 1051, a reproduction address storage area 1052, and a reproduction speed-related data storage area 1054.

The reproduction flag storage area 1051 stores a value of a reproduction flag. The reproduction flag refers to a flag indicative of whether a recorded program is at present under reproduction. If so, it is "1" and if not, it is "0".

The reproduction address storage area 1052 stores a reproduction address, which refers to data indicative of the present position of the recorded program under reproduction and is represented by an elapse time (in hours, minutes and seconds) from the beginning of the program. The reproduction address is updated at a speed depending on the reproduction speed at which the reproduction process advances.

The reproduction speed-related data storage area 1054 stores reproduction speed-related data 1044 read from ROM 1040 or HDD 1060. When a recorded program is reproduced, corresponding reproduction speed-related data 1044 is stored there. When the reproduction speed-related data 1044 is changed, it is stored there.

HDD 1060 stores recorded program data 1061 and second reproduction speed-related data 1044-2. The recorded program data 1061 includes data on a program of a digital terrestrial television broadcast received and recorded by the television unit 1010. It comprises video data 1062, voice data 1063 and content data 1064. Each time a new program of the digital terrestrial television broadcast is recorded, newly recorded program data 1061 is produced and stored.

The external interface 1072 is used when the recording/reproduction apparatus 1001 communicates with an external device therethrough. It comprises, for example, a communication device for connection to a communication network N, for example, of the Internet, and a reader that reads data (or information) stored on an information recording medium set on the recording/reproduction apparatus 1001 such as a CD, a DVD or a memory card.

The user interface 1074 is used when the viewer inputs various data and instructions to the recording/reproduction apparatus 1001 therethrough. The user interface 1074 comprises, for example, various switches such as a recording switch that starts to record a digital terrestrial television broadcast, a reproduction switch that starts to reproduce a recorded program, a stop switch that stops the recording/reproduction, a set switch that changes the reproduction speed-related data 1044, and a storage switch that stores the changed reproduction speed-related data 1044, a touch panel, a remote controller, and a receiver corresponding to the remote controller.

<Flow of the Processing>

Figure 21:
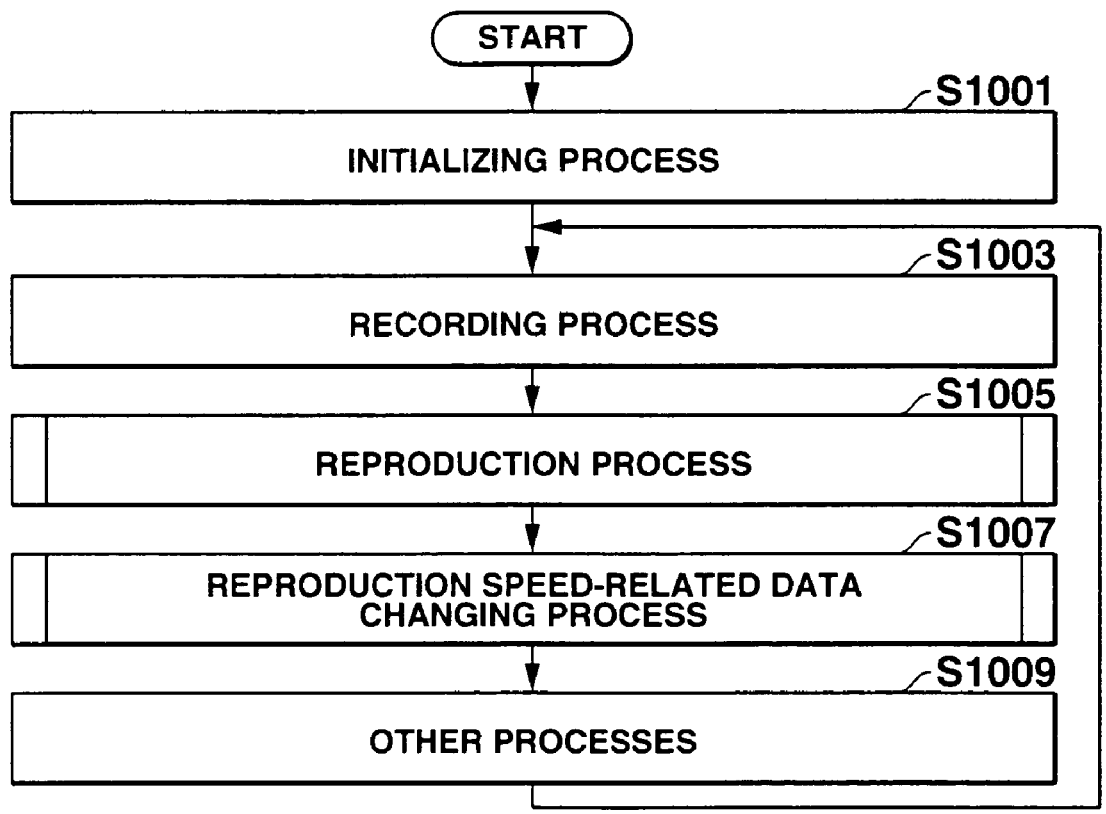
FIG. 21 is a flowchart indicative of a recording/reproduction process as a main process to be performed in the second embodiment.

A flow of the processing will be described next. FIG. 21 is a flowchart indicative of a recording/reproduction process that is the main process in this embodiment. The process is performed when the power supply switch of the recording/reproduction apparatus 1001 is turned on and CPU 1030 executes the recording/reproduction program 1041 stored in ROM 1040.

In FIG. 21, CPU 1030 first performs an initializing process to set its operating environment (step S1001) and then performs a recording process (step S1003).

In the recording process, when the recording switch is turned on, thereby starting to record the program or the recording start time set by the timer function has come, CPU 1030 controls the television unit 1010 so as to start reception of a digital terrestrial television broadcast from a channel (or broadcasting station) specified by the viewer. CPU 1030 then stores video data 1062 and voice data 1063 based on a video signal and a voice signal, respectively, received from the decoder 1014 during the reception of the program selected by the viewer, extracts data explaining the content of a scene under broadcasting at present from the metadata included in the data signal, and creates content data 1064 of the program that includes the extracted data and the broadcast elapse time starting from the beginning of the program.

When CPU 1030 is instructed to stop the recording, for example, due to the stop switch being turned on or the recording end time set by the timer function having come, CPU 1030 controls the television unit 1010 so as to stop reception of the digital terrestrial television broadcast and then stores the video data 1062 and voice data 1063 stored for the time period from the start of its recording to its stop along with the created content data 1064 as recorded program data 1061 in HDD 1060.

Figure 22:
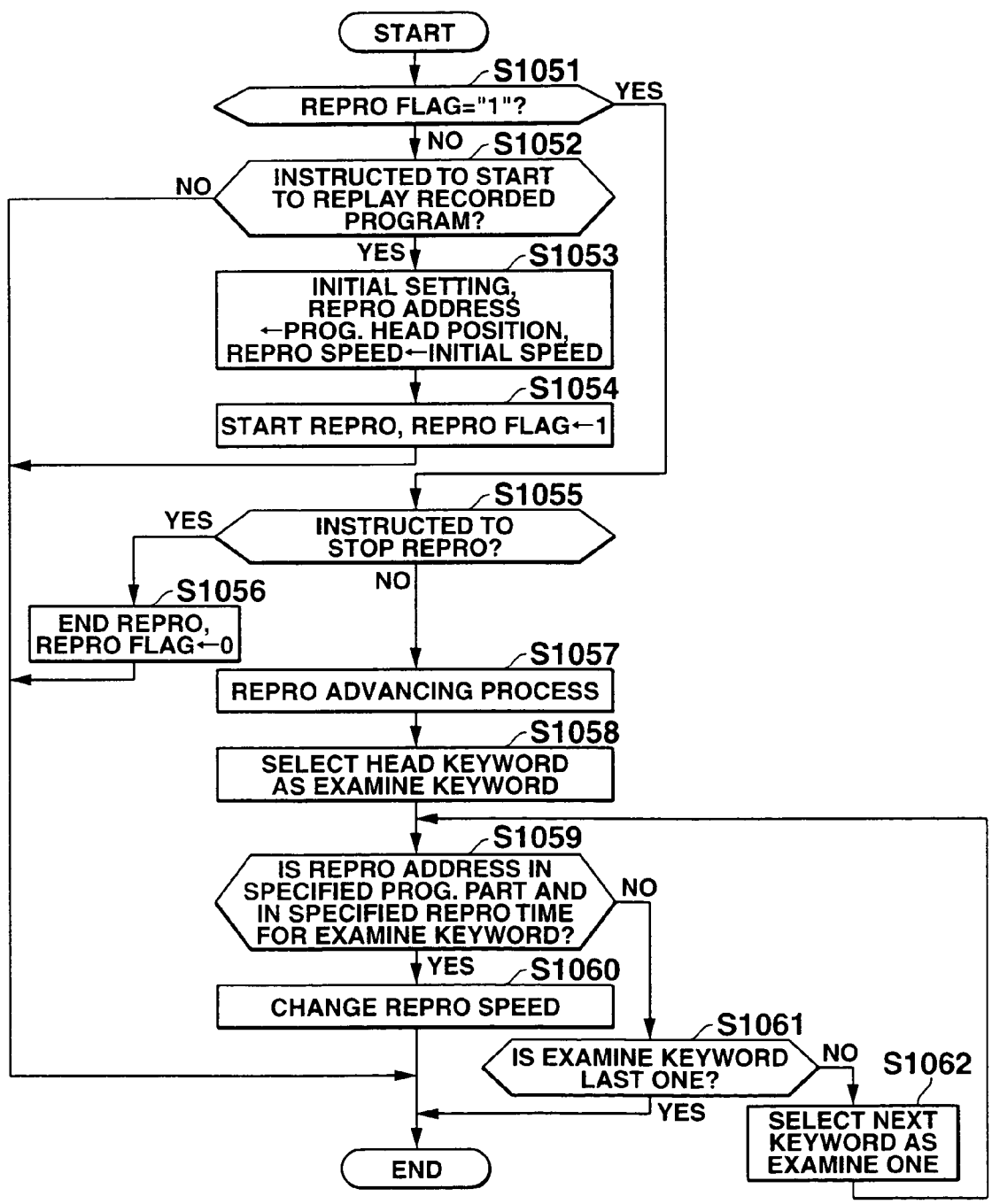
FIG. 22 is a flowchart indicative of a flow of the reproduction process to be performed in the second embodiment.

When the recording process has ended, CPU 1030 then performs the reproduction process (step S1005). FIG. 22 is a flowchart of the reproduction process, which is achieved when CPU 1030 executes the reproduction program 1042 stored in ROM 1040.

In FIG. 22, in the reproduction process CPU 1030 first checks the reproduction flag. If the reproduction flag is set to "0" (No in step S1051), CPU 1030 determines that no program is under reproduction at present and then determines whether CPU 1030 is instructed to reproduce a desired recorded program, for example, due to the reproduction switch being turned on (step S1052).

If not (No in step S1052), CPU 1030 terminates the reproduction process and then returns to step S1007 of FIG. 21. When CPU 1030 determines that CPU 1030 is instructed to reproduce a desired recorded program (Yes in step S1052), it displays a predetermined select picture on the video display 1022, prompts the viewer to select the desired program from among the recorded programs involved in the recorded program data 1061 stored in HDD 1060, reads out from HDD 1060 corresponding recorded program data 1061 and reproduction speed-related data 1044 corresponding to the kind of the selected recorded program from HDD 1060 or ROM 1040. CPU 1030 then sets a value indicative of a head position of the program at the reproduction address, and sets the reproduction speed to a predetermined initial one, thereby performing the initial setting process for reproducing purposes (step S1053).

Then, CPU 1030 starts to reproduce the program based on the read recorded program data 1061 and sets the reproduction flag to "1" (step S1054). That is, CPU 1030 outputs to the voice output unit 1024 a voice signal based on the voice data 1063 included in the read recorded program data 1061, thereby starting to let off the corresponding television sound, and outputs a video signal based on the video data 1062 to the video display 1022, thereby starting to display the corresponding television video. Then, CPU 1030 terminates the reproduction process and returns to step S1007 of FIG. 21.

When the reproduction flag is set to "1" (Yes in step S1051), CPU 1030 determines that the recorded program is under reproduction and then determines whether CPU 1030 is instructed to stop the reproduction, for example, due to the stop switch being turned on (step S1055). If so (Yes in step S1055), CPU 1030 stops the reproduction of the recorded program under reproduction and then sets the reproduction flag to "0" (step S1056). Then, CPU 1030 terminates the reproduction process and then returns to step S1007 of FIG. 21.

When CPU 1030 is not instructed to stop the reproduction (No in step S1055), CPU 1030 performs a reproduction advancing process such that the reproduction continues at the set reproduction speed and updates the reproduction address in accordance with the reproduction speed (step S1057).

Then, CPU 1030 uses a head keyword stored in the read reproduction speed-related data 1044 as one to be examined (or an examine keyword) (step S1058). CPU 1030 then refers to the content data 1064 included in the read recorded program data 1061 and determines whether the present reproduction position of the program part indicated by the reproduction address is both within a program part to be reproduced at a reproduction speed specified for the examine keyword and within a reproduction time specified for the examine keyword (step S1059).

Figure 23A:
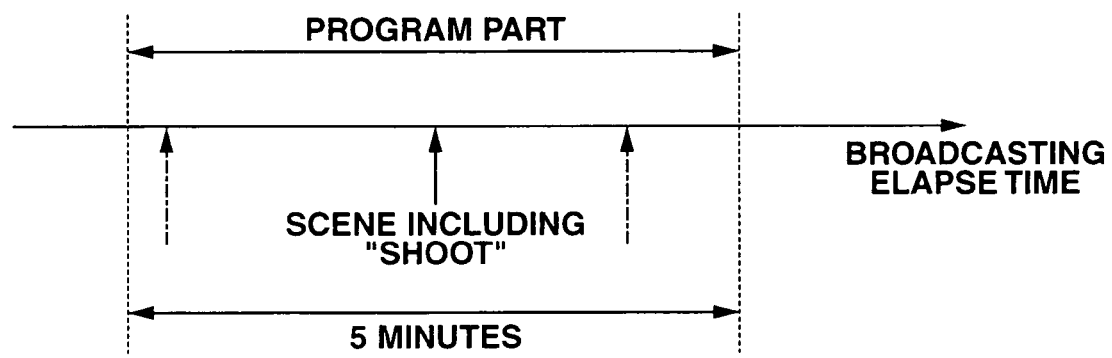
FIG. 23A is a diagram illustrating whether or not the reproduction is being performed in a specified program part and a specified reproduction time, respectively, in the second embodiment.

More specifically, when the examine keyword is "shoot" in the reproduction speed-related data 1044 shown in FIG. 20, a 5-minute program range including the scene for the examine keyword "shoot" and its previous and following program parts satisfies both a specified reproduction program part to be reproduced at specified one times the normal reproduction speed and a specified reproduction time for the examine keyword "shoot", as shown in FIG. 23A. Thus, if the scene for the keyword "shoot" is in a range of five minutes including a point of time for the present reproduction position in the content data 1064, it is determined that the present reproduction is both within the specified program part to be reproduced at the specified speed and within the reproduction time for the examine keyword "shoot".

Figure 23B:
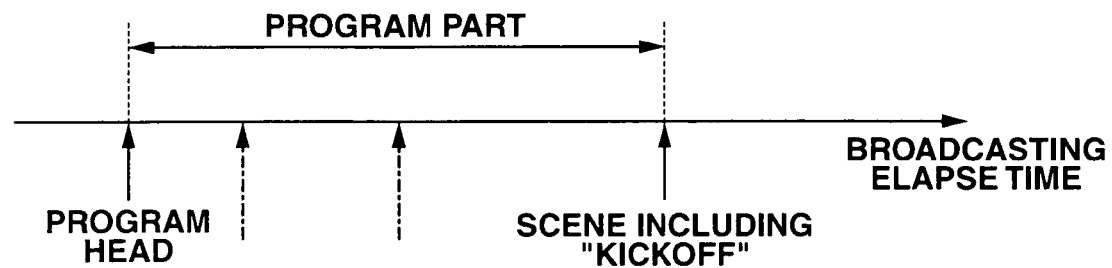
FIG. 23B is a similar view to FIG. 23A.

When the examine keyword is "kickoff", as shown in FIG. 23B the whole program part present before (or earlier than) the scene for the keyword "kickoff" satisfies both a program part to be reproduced at a speed specified for the keyword "kickoff" and a reproduction time specified for the keyword "kickoff". Thus, if in the content data 1064 a scene for the keyword "kickoff" is after (or later than) the preset reproduction position, it is determined that the present reproduction is both within the program part to be reproduced at a speed for the keyword "kickoff" and within the reproduction time specified for the keyword "kickoff".

When CPU 1030 determines that the present reproduction is both within the program part to be reproduced at the speed specified for the examine keyword and within the reproduction time specified for the examine keyword (Yes in step S1059), it changes the present reproduction speed to one for the examine keyword in the reproduction speed-related data 1044 (step S1060). Then, CPU 1030 terminates the reproduction process and returns to step S1007 of FIG. 21.

If the present reproduction is neither in the specified program part nor in the specified reproduction time (No in step S1059), CPU 1030 determines whether the examine keyword is the last one of the reproduction speed-related data 1044. If so (Yes in step S1061), CPU 1030 terminates the reproduction process and returns to step S1007 of FIG. 21.

If not (No in step S1061), a keyword stored next to the present examine keyword in the reproduction speed-related data 1044 is determined as a new examine keyword (step S1062). Then, CPU 1030 returns to step S1059 and repeats a similar process including steps S1059 to S1062.

Figure 24:
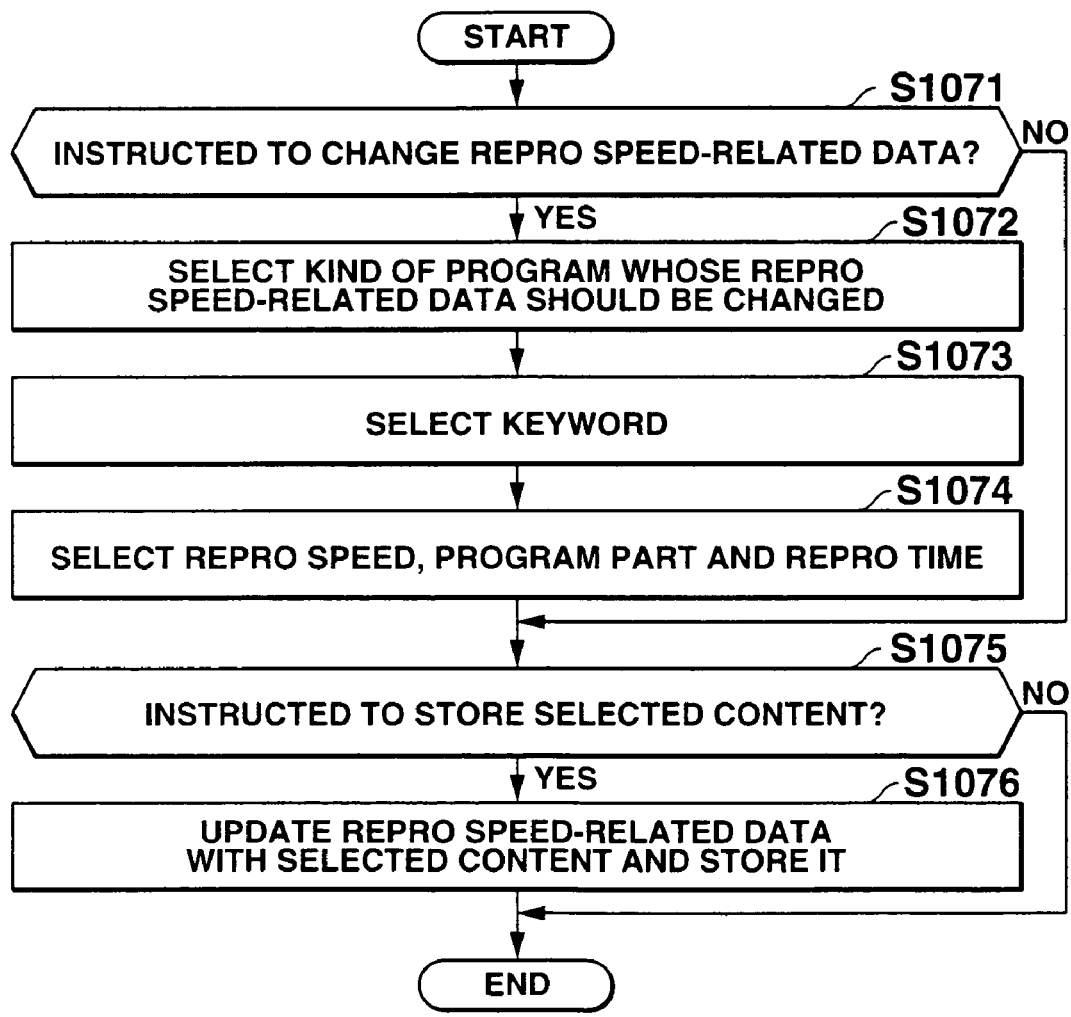
FIG. 24 is a flowchart indicative of a reproduction speed-related data changing process to be performed in the second embodiment.

When the reproduction process ends, CPU 1030 then executes a reproduction speed-related data changing process of FIG. 24 (step S1007). This process is achieved when CPU 1030 executes a reproduction speed-related data changing program 1043 stored in ROM 1040.

In FIG. 24, CPU 1030 first determines whether CPU 1030 is instructed to change the reproduction speed-related data 1044, for example, due to the set switch being turned on (step S1071).

If not (No in step S1071), CPU 1030 goes to step S1075. If so (Yes in step S1071), CPU 1030 displays a predetermined select picture on the video display 1022, thereby prompting the viewer to select the kind of program for which the reproduction speed-related data 1044 should be changed (step S1072). CPU 1030 then reads the reproduction speed-related data 1044 for the selected kind of program and then displays on the video display 1022 a reproduction speed-related data changing picture that changes the content of the reproduction speed-related data 1044 for the selected kind of program.

FIG. 25 illustrates one example of the reproduction speed-related data changing picture when the kind of program is "soccer game relay". As shown, the reproduction speed-related data changing picture comprises the same plurality of keywords E1 as are stored in the reproduction speed-related data 1044, a plurality of reproduction speeds E2 for each keyword E1, a like number of program parts E3 and a like number of reproduction times E4 with one of the like number of reproduction speeds E2, one of the like number of program parts E3 and one of the like number reproduction times E4 selected, emphatically displayed. FIG. 25 shows the set content of the reproduction speed-related data 1044 appearing immediately after the display of the reproduction speed-related data changing picture.

The viewer selects a keyword E1 involved in reproduction speed-related data whose set content should be changed on the reproduction speed-related data changing picture (step S1073) and then selects one from the plurality of reproduction speed E2, one from the like number of program parts E3 and one from the like number of reproduction times E4 for the selected keyword E1 (step S1074).

Then, CPU 1030 determines whether CPU 1030 is instructed to store the selected data, for example, due to the storage switch being turning on. If not (No in step S1075), CPU 1030 terminates the display of the reproduction speed-related data changing picture and the reproduction speed-related data changing process and then returns to step S1009 of FIG. 21. If so (Yes in step S1075), CPU 1030 updates new reproduction speed-related data 1044 with the present content selected on the reproduction speed-related data setting picture and stores it in HDD 1060 (step S1076). Then, CPU 1030 terminates the display of the reproduction speed-related data changing picture and the reproduction speed-related data changing process and then returns to step S1009 of FIG. 21.

When CPU 1030 terminates the reproduction speed-related data changing process, it then executes another process (step S1009). Then, CPU 1030 goes to step S1003 where it repeats a similar process of steps S1003-1009 until the power supply is cut off due to the power switch being turned off.

<Advantageous Effects>

As described above, according to the first embodiment, the recording/reproduction apparatus records a digital broadcast and reproduces videos and voices on a program part or section involved in a keyword that satisfies predetermined requirements selected among a plurality of keywords each involved in a respective one of the like number of program parts or sections that compose the selected broadcast program of the received digital broadcast. Thus, a desired program part of section can be retrieved in a short time.

According to the first embodiment, the recording/reproduction apparatus is capable of receiving a plurality of keywords and a like number of program parts or sections corresponding to a like number of time zones of the broadcasting time and involved in the plurality of keywords from the server, and reproducing only videos and voices involved in a program part or section involving a keyword that meets predetermined requirements selected from among the received keywords.

According to the second embodiment, the recording/reproduction apparatus is capable of receiving a digital television broadcast, recording videos and voices on the selected program included in the received digital television broadcast, and recording metadata of the selected program and the broadcasting elapse time in corresponding relationship. The reproduction of the recorded videos and voices is controlled based on the broadcasting elapse time corresponding to data including the associated keyword included in the reproduction speed-related data of the recorded metadata and the reproduction speed corresponding to the keyword in the reproduction speed-related data.

Thus, it is determined whether a keyword in the reproduction speed-related data is present in the content of the program represented by the metadata recorded in corresponding relationship to the broadcast time corresponding to the present reproduction position. If so, the content of the program can be reproduced at a speed corresponding to the keyword. That is, the reproduction speed can be changed in accordance with the content of the program. A program part that the viewer desires to view can be reproduced at a lower set reproduction speed whereas a program part that the viewer does not desire to view can be reproduced at a higher set reproduction speed, thereby providing efficient reproduction for the viewer.

<<Modification>>

While in the first and second embodiments the recording/reproduction apparatus is illustrated as receiving a digital terrestrial television broadcast, the present invention is not limited to these particular cases, of course. For example, the present invention is applicable likewise to CS and BS digital broadcasting as well as program distribution services and VOD (Video On Demand) services of the digital television broadcasts provided via cable televisions or a network, of course.

While in the first embodiment the recording/reproduction apparatus 1 is illustrated as a dedicated one which will be used by itself, the inventive recording/reproduction apparatus is not limited to such manufactured articles. For example, the present invention is applicable to computers with a built-in reception board that receives digital video broadcasting and a built-in program recording/reproduction function and also to PDAs (Personal Digital Assistants) and mobile telephones that comprise a digital broadcast receiver.

While in the setting process using the frequency of keyword emergence or extraction, the matching criterion keywords are illustrated as determined in decreasing order of emergence or extraction frequency, the present invention is not limited to this particular case. For example, only keywords that meet predetermined requirements or keywords of emergence or extraction frequencies higher than a predetermined one may be determined as the matching criterion keywords. In this case, the keywords of emergence or extraction frequencies higher than the predetermined one may be extracted sequentially, starting with the first one. Thus, the order of reproduction is in accordance with the elapse of time, which is effective for a broadcast (or its contents) such as a sport program in which the elapse of time is important.

When the program is reproduced in the reproduction process, the total time of the keyword scenes stored in the program keyword list 404 may be displayed. In this case, a further reproduction keyword may be specified such that the retrieval time is reduced. Alternatively, the reproduction group may be changed such that efficient viewing can be achieved.

While in the first embodiment reproduction of a program data whose start and end times are stored in the corresponding keyword scene is illustrated, the program part ranging from five seconds before the start of the scene to five seconds after the keyword scene may be reproduced. In this case, by viewing the keyword scene and its previous and following program parts, the content of the keyword scene can be easily understood.

While in the second embodiment the examine keywords to change the reproduction speeds are illustrated as selected sequentially from the keywords stored in the reproduction speed-related data 1044, starting with the first keyword, the keywords may be given respective priorities according to which the keywords may be selected.

While in the second embodiment the reproduction speed 1044b, program part 1044c and reproduction time 1044d corresponding to each of the keywords 1044a included in the reproduction speed-related data 1044 stored in ROM 1040 or on HDD 1060 are illustrated as changed, a new keyword 1044a may be added for changing purposes.

The reproduction may be controlled in accordance with reproduction speed-related data 1044 acquired externally via the external interface 1072.

More specifically, a communication device may be provided as the external interface 1072 that communicates with an external recording/reproduction apparatus. The present recording/reproduction apparatus 1001 stores on HDD 1060 reproduction speed-related data 1044 from the external device so as to control the reproduction speed thereof. A reader may be set as the external interface 1072 so as to read the reproduction speed-related data 1044 stored on an information recording medium set removably on the recording/reproduction apparatus 1001, thereby controlling the reproduction speed.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2004-59274 filed on Mar. 3, 2004 and No. 2004-49112 filed on Feb. 25, 2004 and each including specification, claims, drawings and summary. The disclosure of the above Japanese patent application is incorporated herein by reference in its entirety.

What is claimed is:

1. A recording/reproduction apparatus comprising:

a receiver that receives a digital television broadcast;

a program recorder that records thereon video and voice data of a selected program included in the digital television broadcast received by the receiver;

a metadata recorder that records metadata of the selected program included in the received digital television broadcast and a broadcasting elapse time of the program in a corresponding relationship;

a speed-related data storage device that stores reproduction speed-related data comprising: (i) a plurality of keywords, each related to a respective one of a like number of program sections of the selected program, and (ii) a like number of reproduction speeds in a corresponding relationship with the plurality of keywords;

a reproduction output unit that reproduces and outputs the video and voice data recorded on the program recorder; and means for controlling the reproduction output unit so as to reproduce video and voice data of a program section relating to a selected keyword in the reproduction speed-related data for a part of the broadcast elapse time recorded by the metadata recorder and corresponding to the program section at a reproduction speed corresponding to the selected keyword in the reproduction speed-related data.

2. The recording/reproduction apparatus of claim 1, wherein the speed-related data storage device stores a plurality of items of the reproduction speed-related data;

wherein the recording/reproduction apparatus further comprises means for selecting one item from the plurality of items of reproduction speed-related data stored in the speed-related data storage device; and wherein the reproduction speed is based on the selected one item of reproduction speed-related data selected by the selecting means.

3. The recording/reproduction apparatus of claim 1, further comprising means for changing content of the reproduction speed-related data stored in the speed-related data storage device.

4. A computer readable memory having a computer program stored thereon that is executable by a computer provided along with a receiver that receives a digital television broadcast so as to cause the computer to perform functions comprising:

recording video and voice data of a selected program included in the digital television broadcast received by the receiver;

recording metadata of the selected program included in the received digital television broadcast and a broadcasting elapse time of the program in a corresponding relationship;

storing reproduction speed-related data that comprises: (i) a plurality of keywords, each relating to a respective one of a like number of program sections of the selected program, and (ii) a like number of reproduction speeds stored in a corresponding relationship with the plurality of keywords;

reproducing and outputting the recorded video and voice data; and controlling the reproducing of the video and voice data to reproduce video and voice data of a program section relating to a selected keyword in the reproduction speed-related data based on a part of the broadcast elapse time recorded by the metadata recording function and corresponding to the program section and a reproduction speed corresponding to the selected keyword in the reproduction speed-related data.

* * * * *